United States Patent [19]
Judd et al.

[11] Patent Number: 5,889,463
[45] Date of Patent: Mar. 30, 1999

[54] ANTI-THEFT DEVICE

[76] Inventors: Dennis L. Judd, 5500 Burnside Rd., Sebastopol, Calif. 95472; Gene E. Peck, 23457 Cherry, Newhall, Calif. 91321; Ralph M. Swanson, 4175 Harrison Grade, Sebastopol, Calif. 95472

[21] Appl. No.: 780,641

[22] Filed: Jan. 8, 1997

[51] Int. Cl.⁶ ................................................. B60R 25/10
[52] U.S. Cl. ...................... 340/427; 340/425.5; 340/426; 340/432; 70/39; 70/233
[58] Field of Search .................................... 340/427, 426, 340/432; 70/18, 30, 38, 39, 49, 233

[56] References Cited

U.S. PATENT DOCUMENTS

| | | | |
|---|---|---|---|
| 5,408,212 | 4/1995 | Meyers et al. | 340/427 |
| 5,612,510 | 3/1997 | Hildreth | 174/120 |

*Primary Examiner*—Jeffery A. Hofsass
*Assistant Examiner*—Daryl C. Pope
*Attorney, Agent, or Firm*—William C. Milks, III

[57] ABSTRACT

The present invention defines an anti-theft device for use with a variety of personal property, including bicycles, motorcycles and other small vehicles employing a three-part assembly of high-impact glass-filled nylon which attaches to vehicle frames of various size. The fastening means is hidden and sound channels are utilized to enhance an audible alarm and to prevent muffling of an interior speaker, activated by partial cutting or disconnection of a cable of known resistance. The cable is inserted in a case assembly with differing positions depending on whether the user wishes to set the alarm or store the cable out of the way if not energized. The alarm may be silenced by incrementally turning a key and removing a cable. The same key is positioned to allow arming of the alarm by insertion of the cables in the proper orientation. Further, the same key, turned another increment allows removal of the front cover of the assembly exposing the power source and electronics and allowing the unfastening of the assembly from the frame.

5 Claims, 25 Drawing Sheets

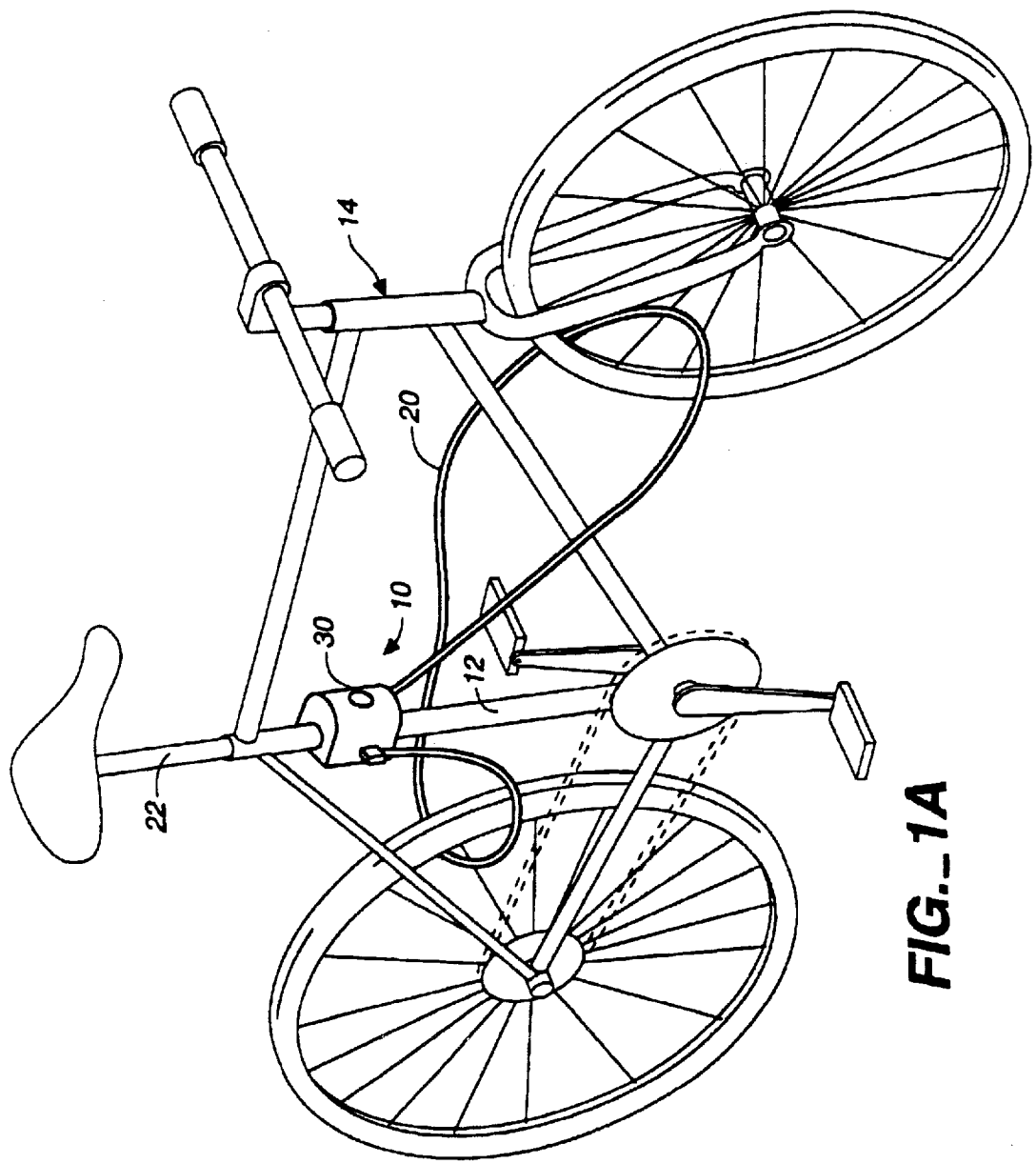
FIG._1A

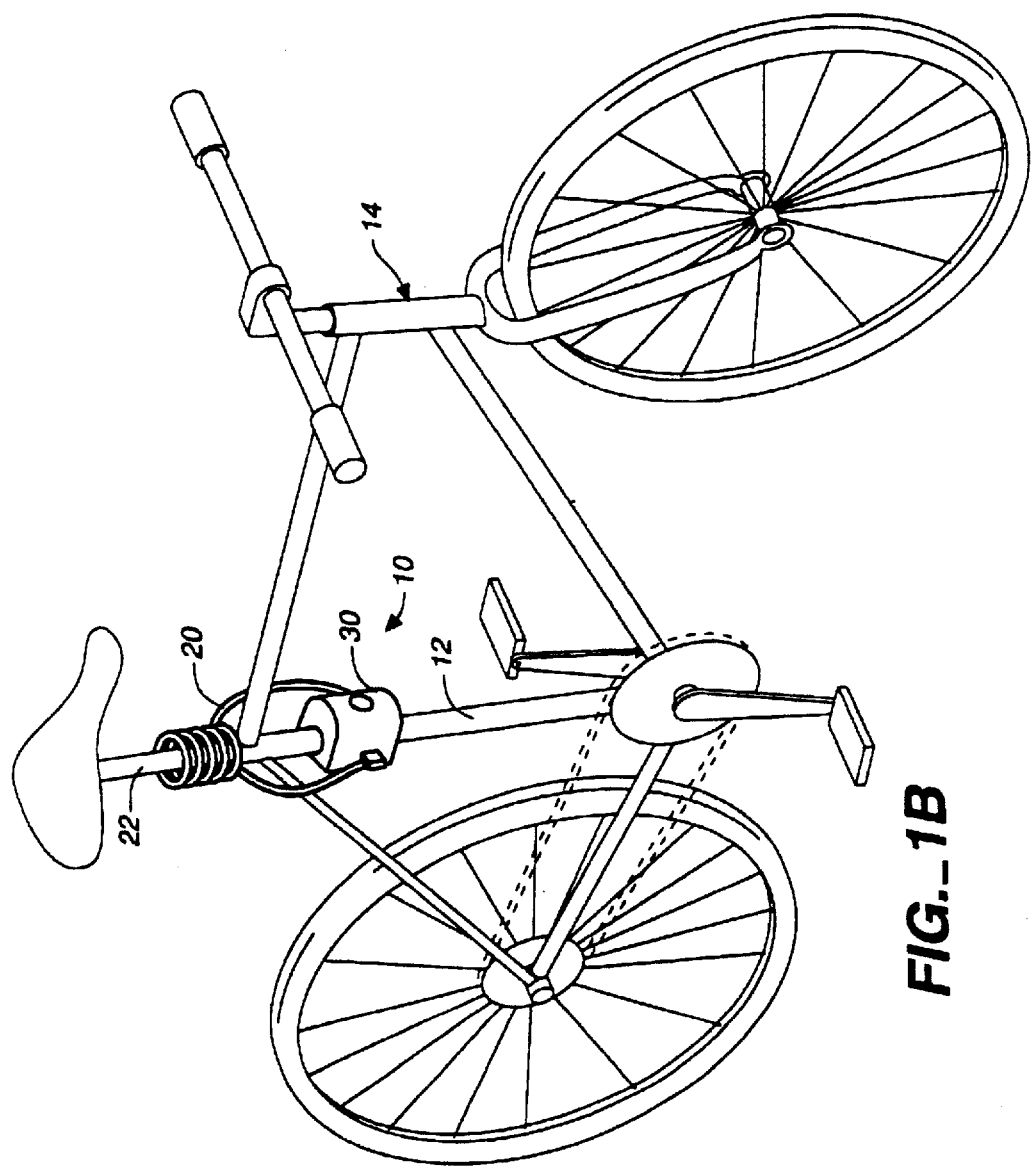
FIG._1B

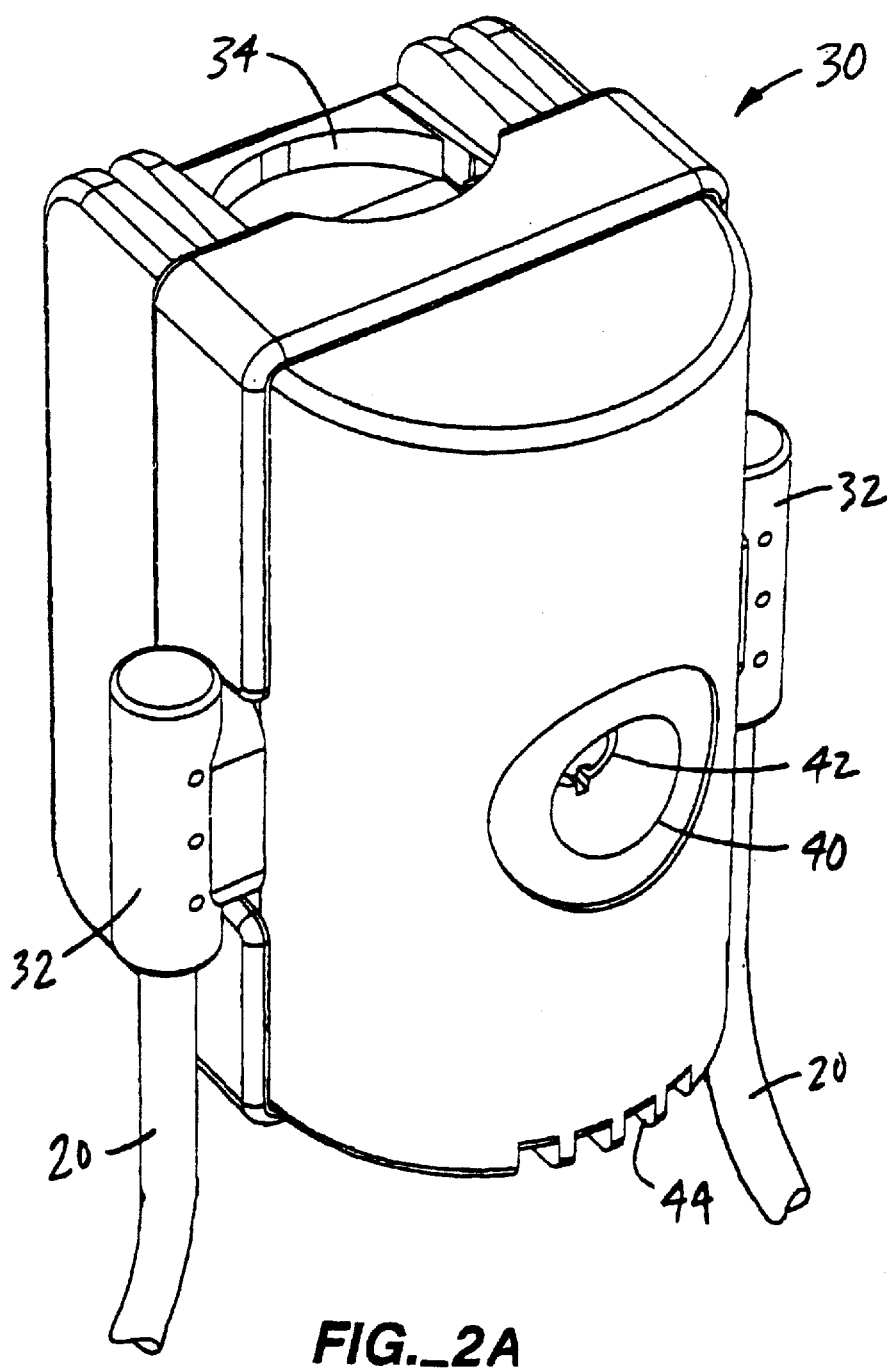
FIG._2A

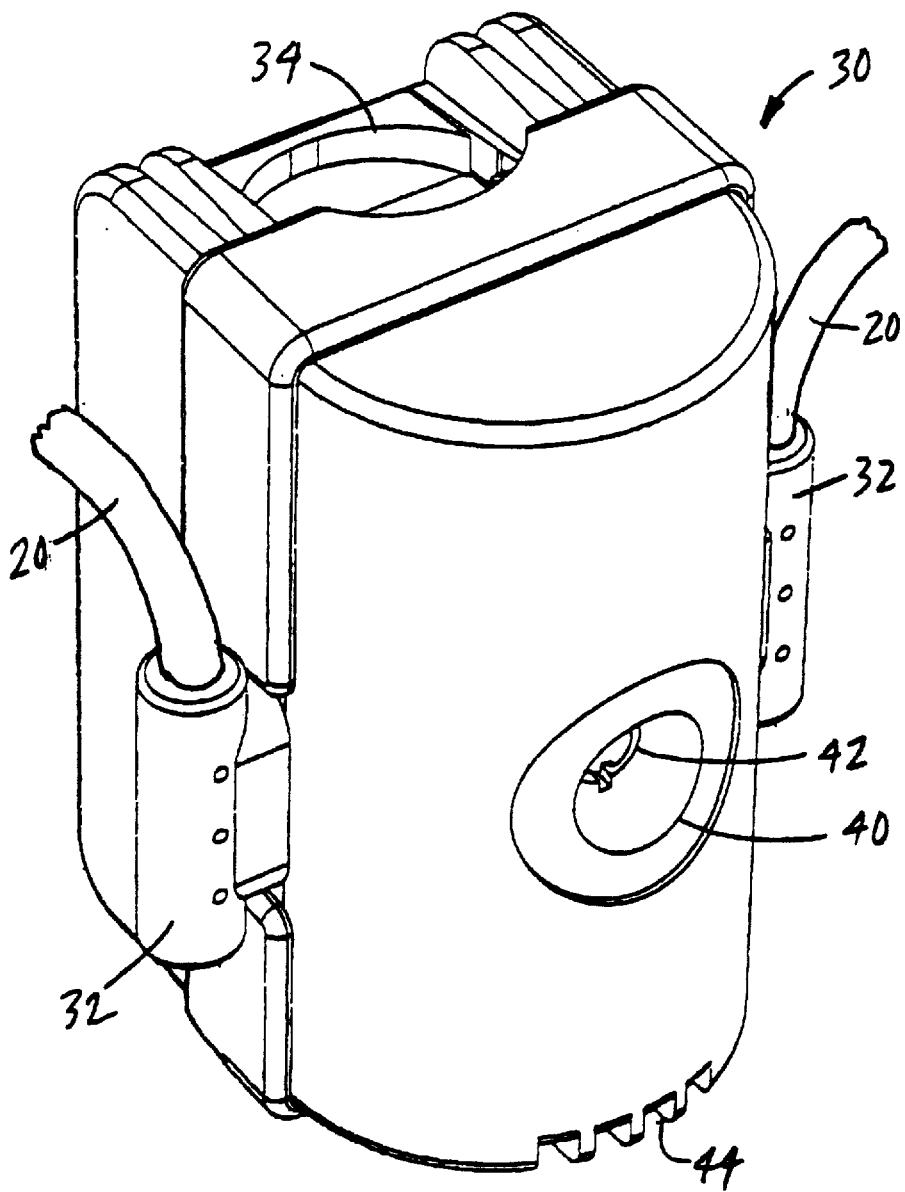
FIG._2B

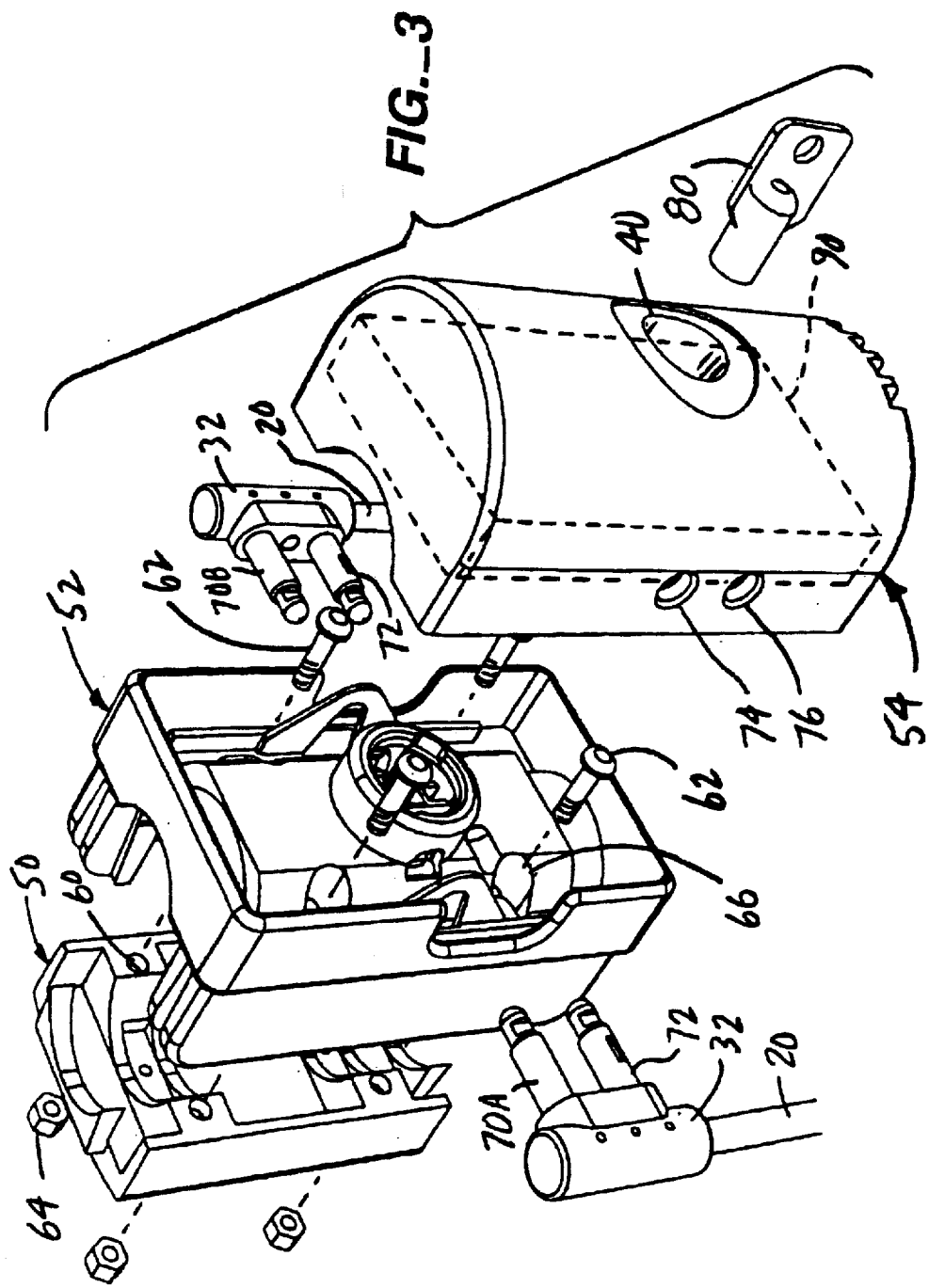

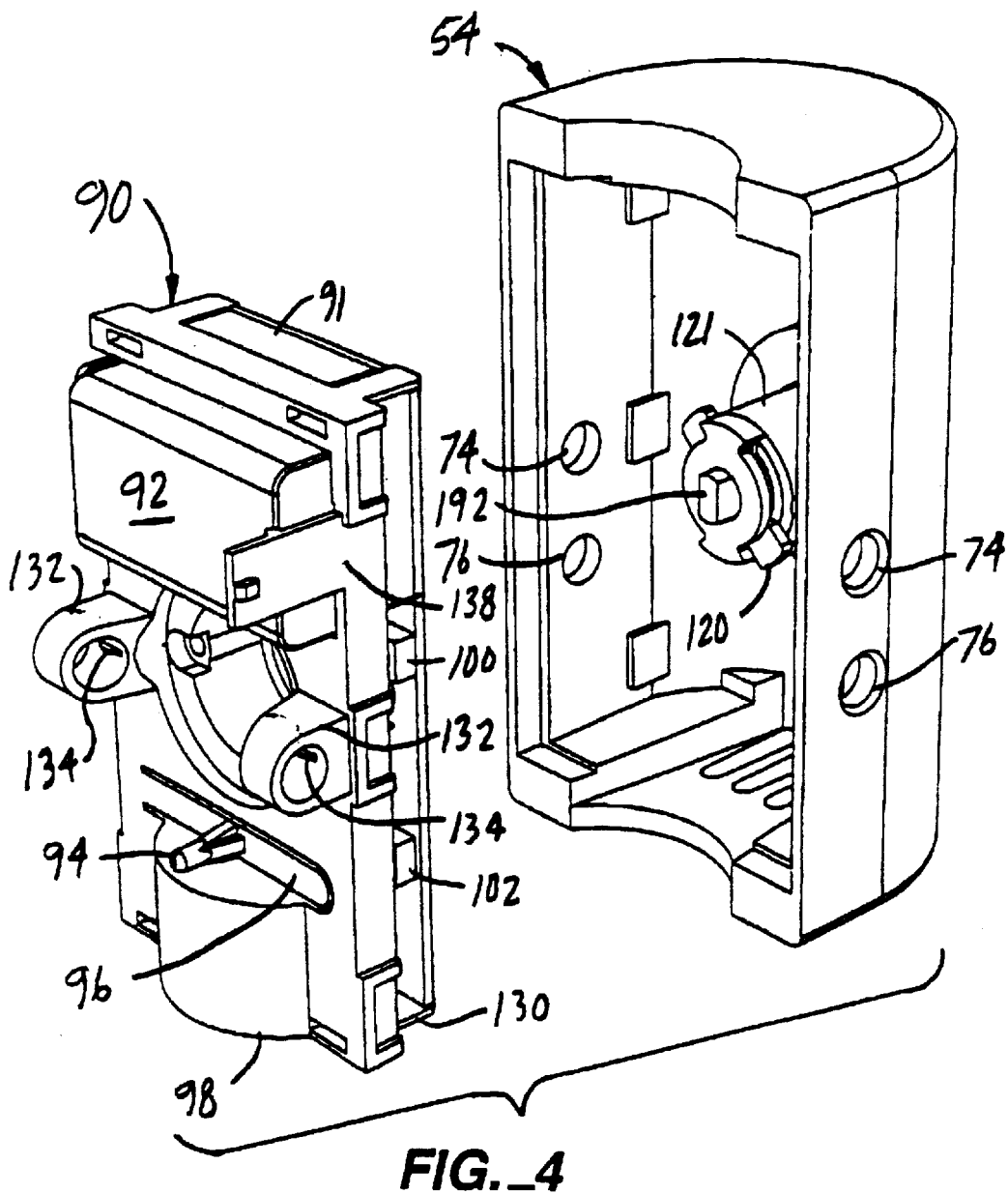
FIG._4

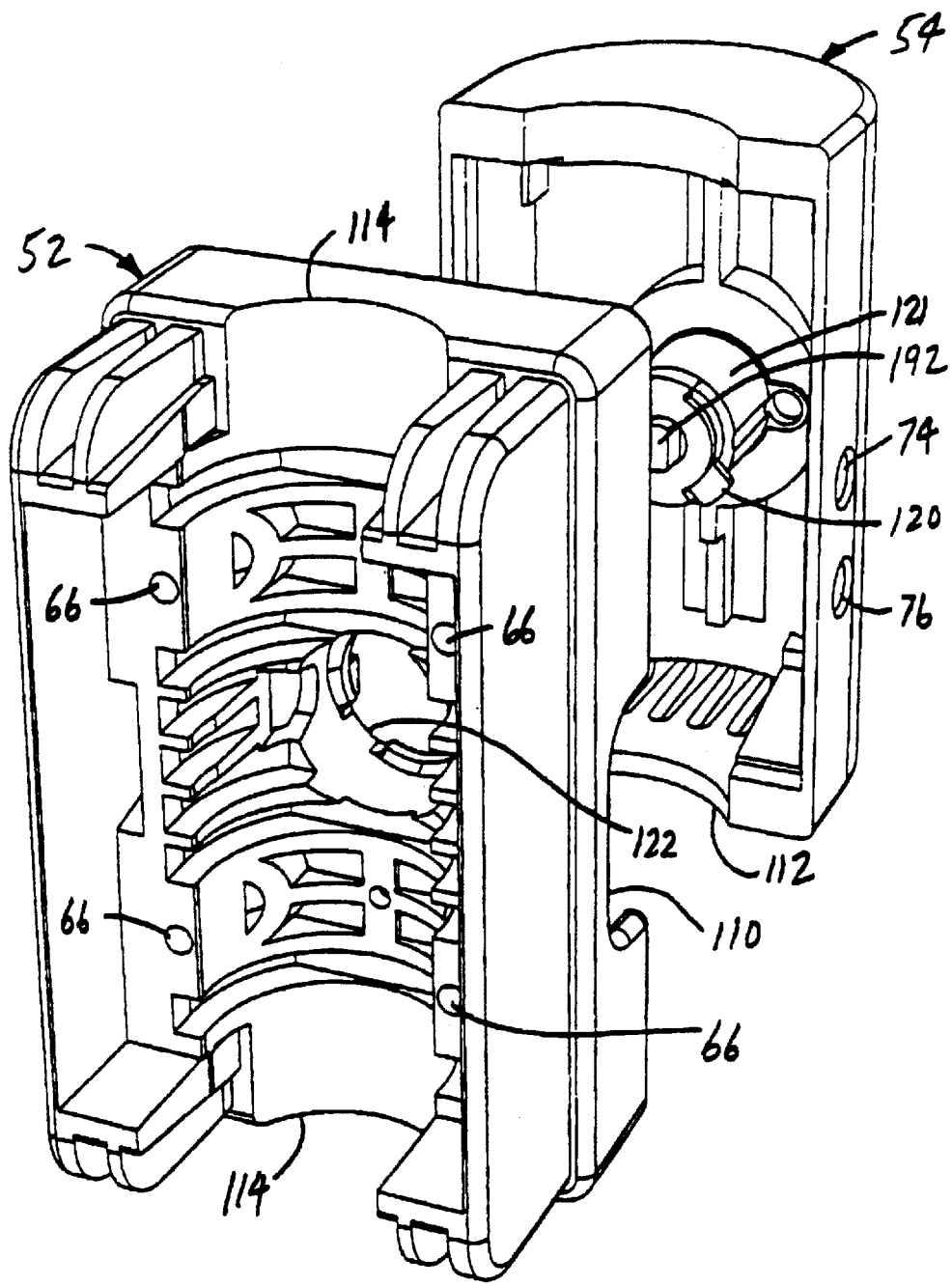
FIG._5

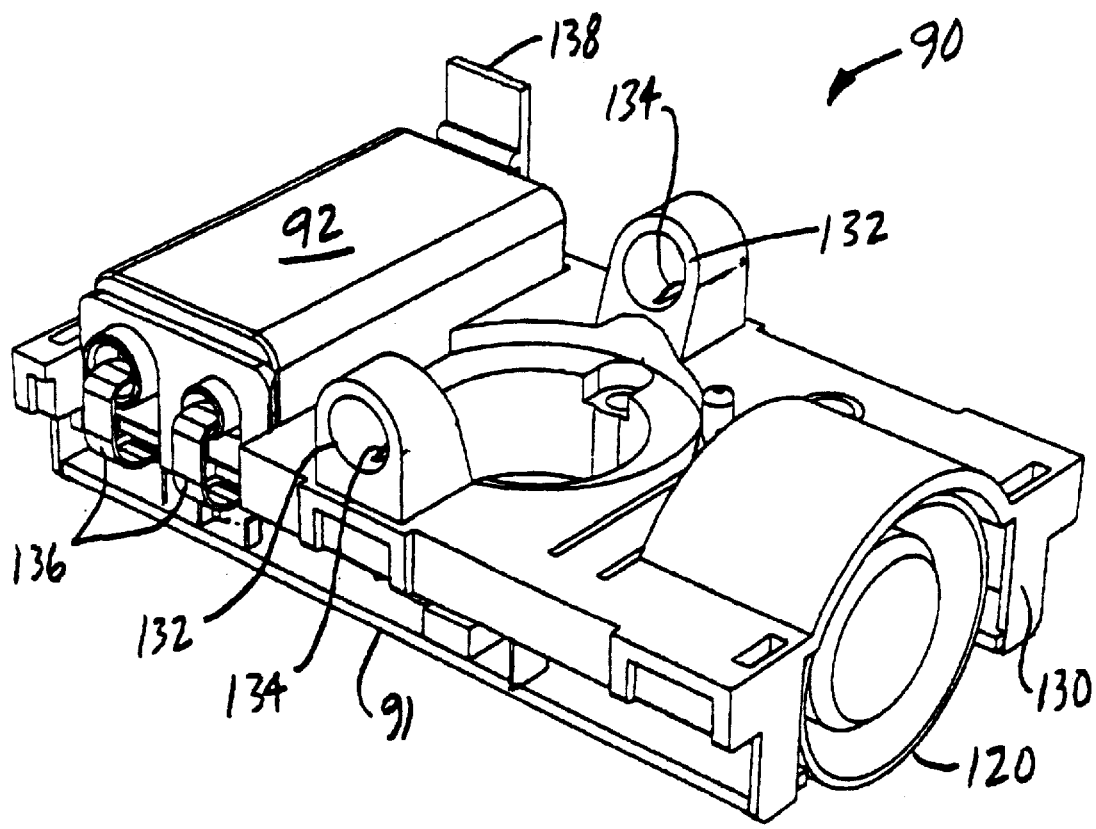
FIG._6A

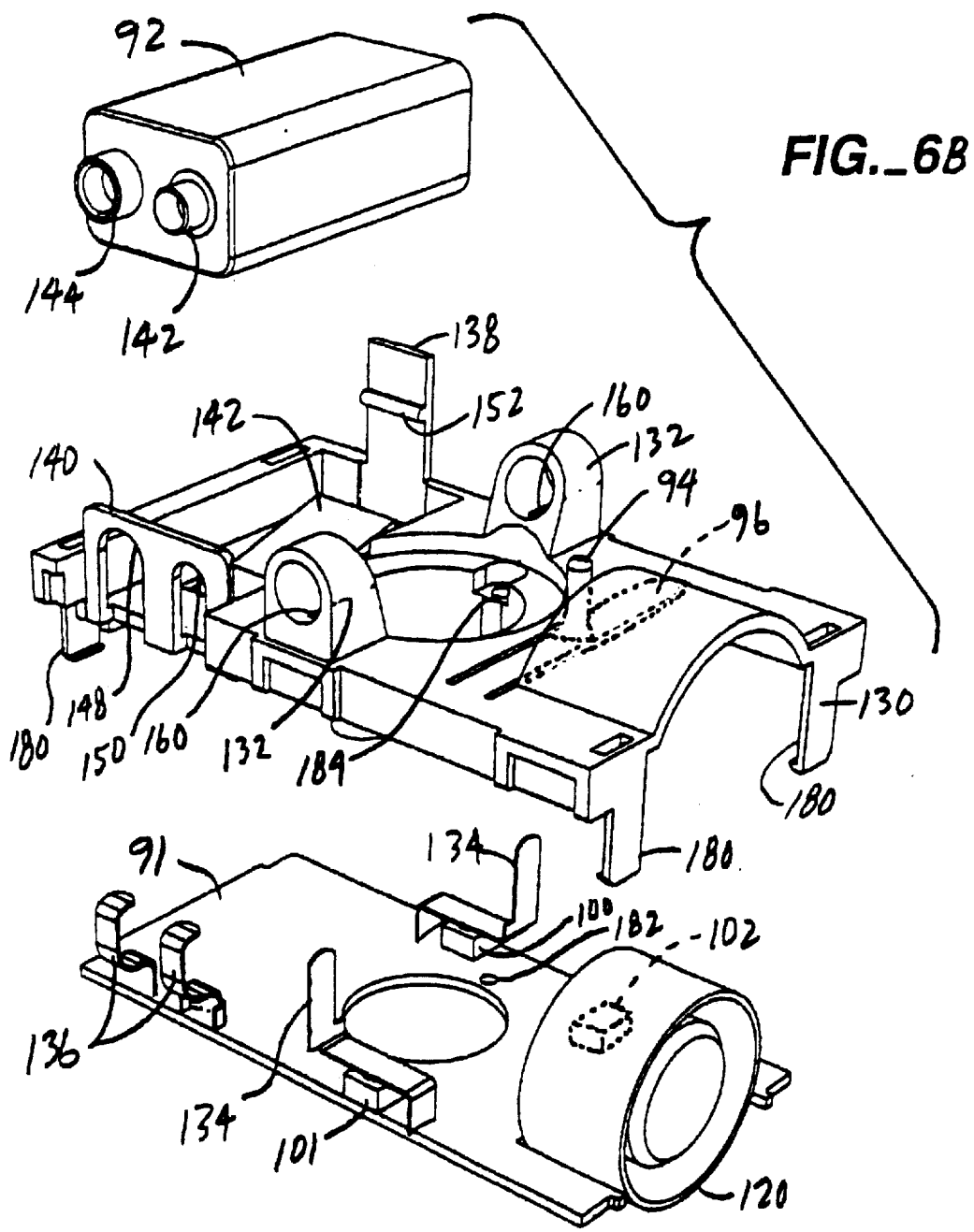
FIG._6B

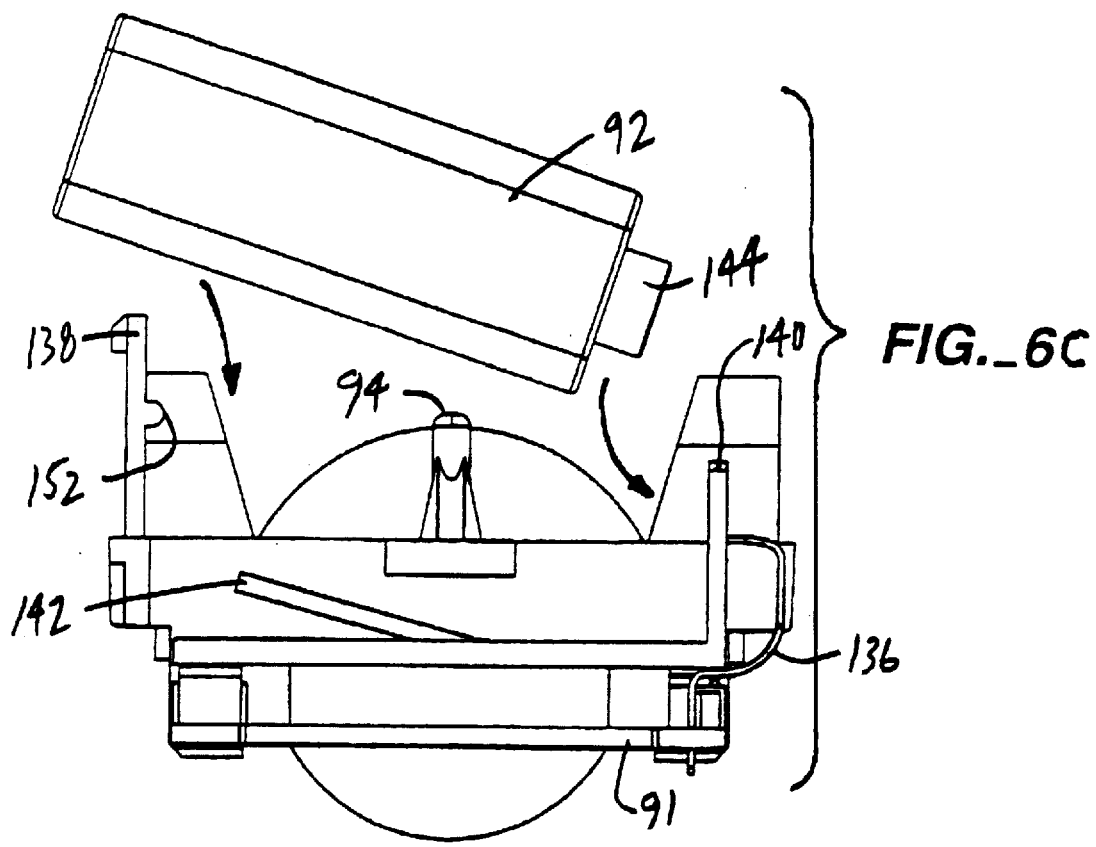
FIG._6C
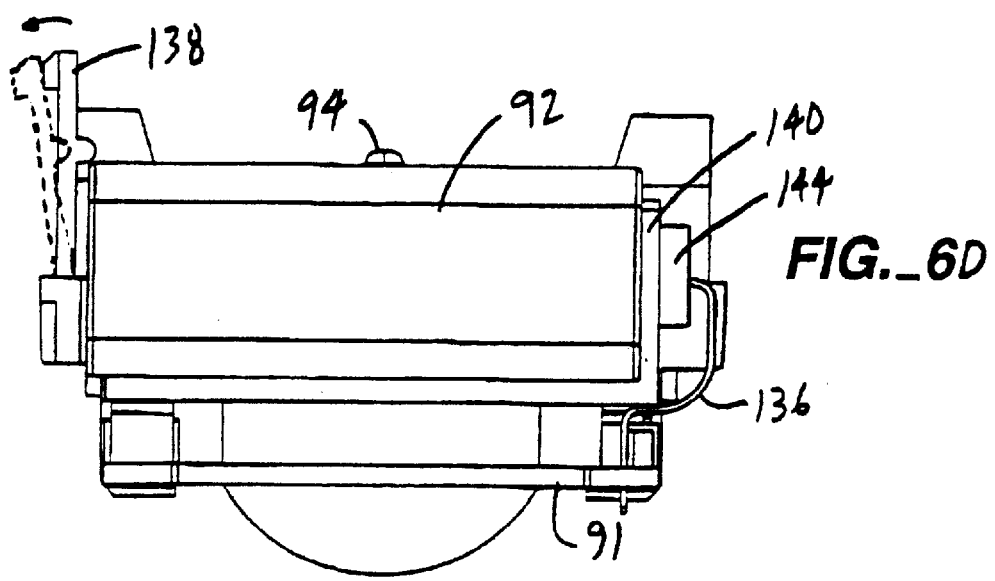
FIG._6D

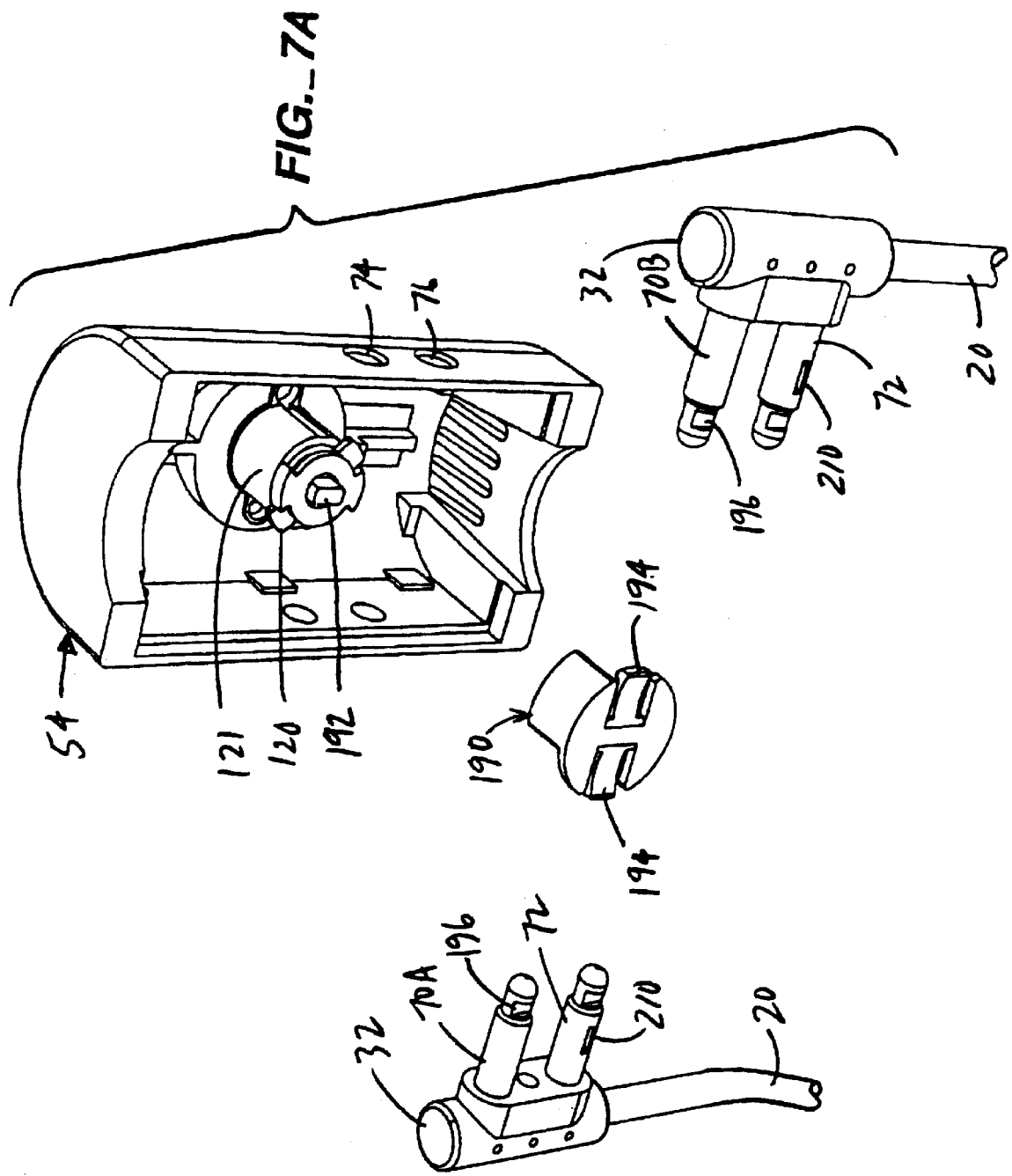

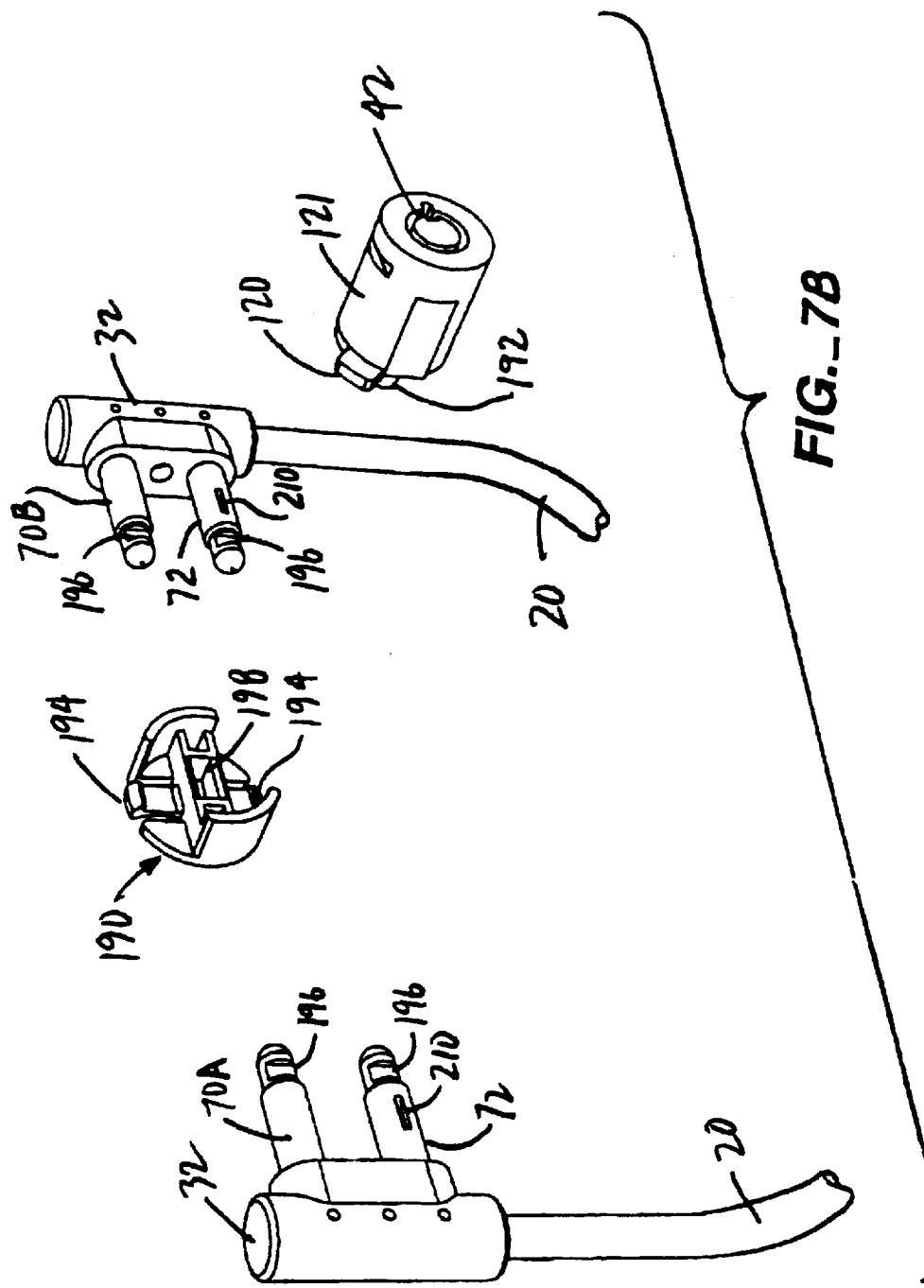
FIG._7B

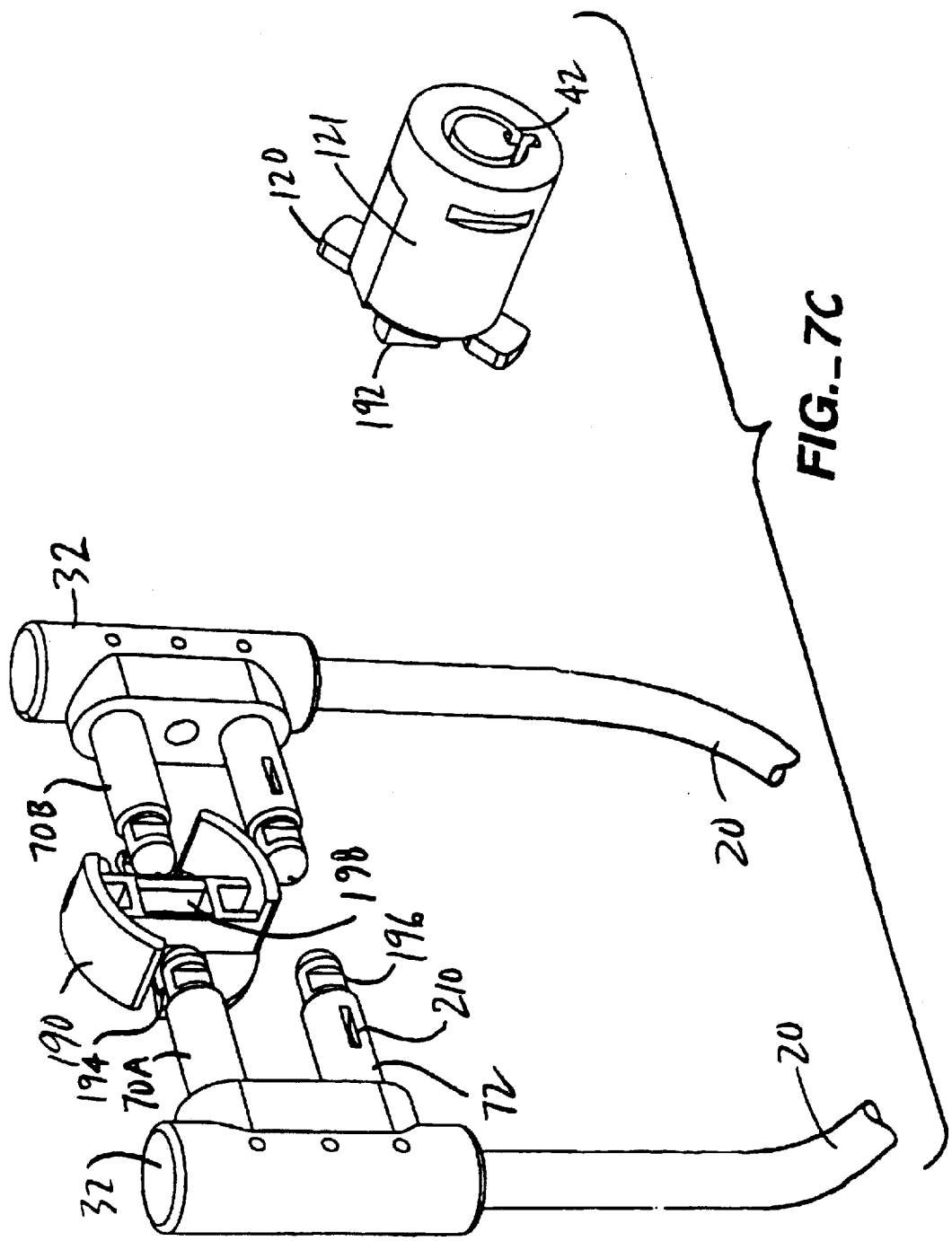
FIG._7C

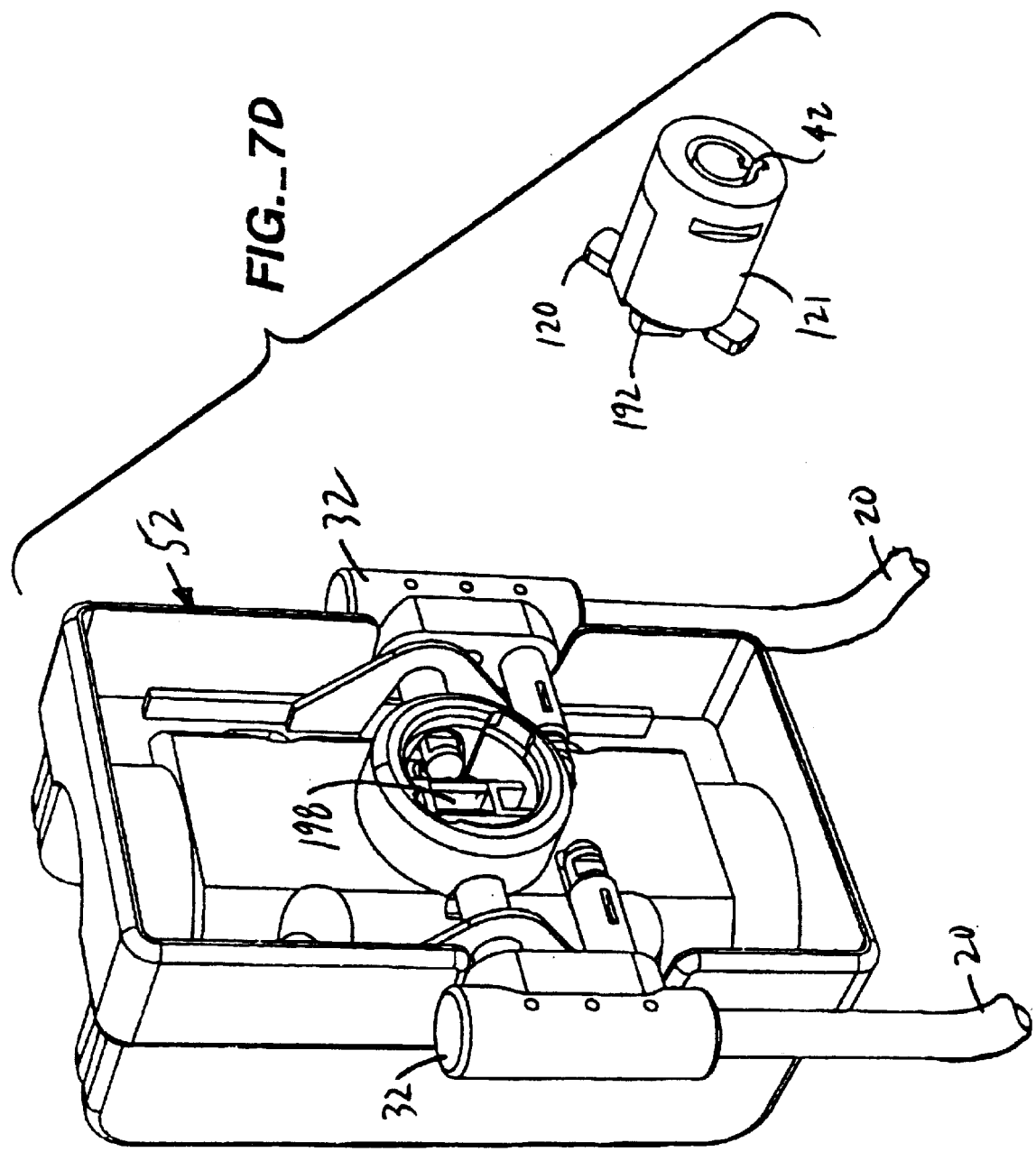

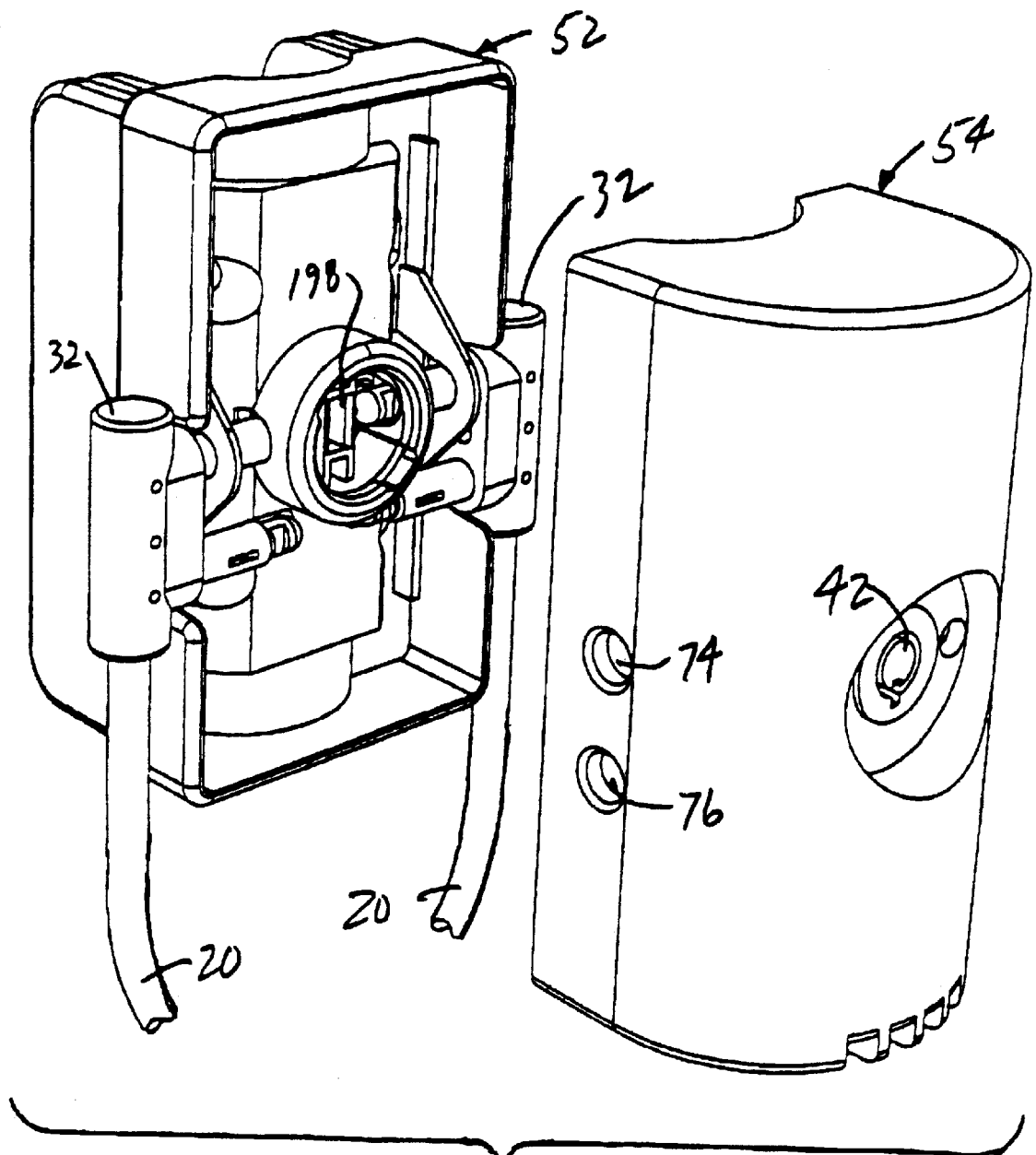
FIG._7E

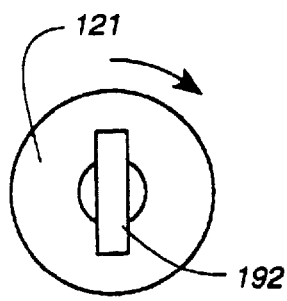 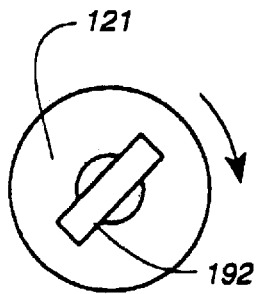 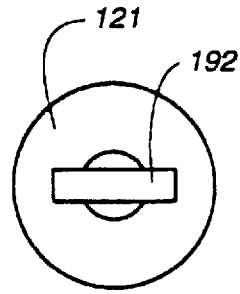
FIG._8A     FIG._8B     FIG._8C
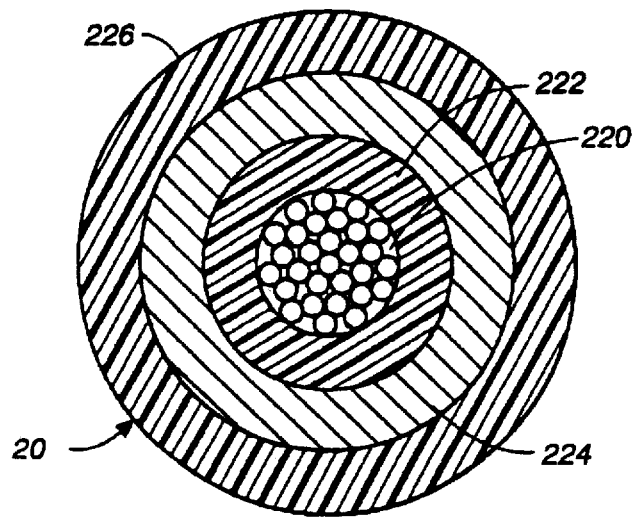
FIG._11

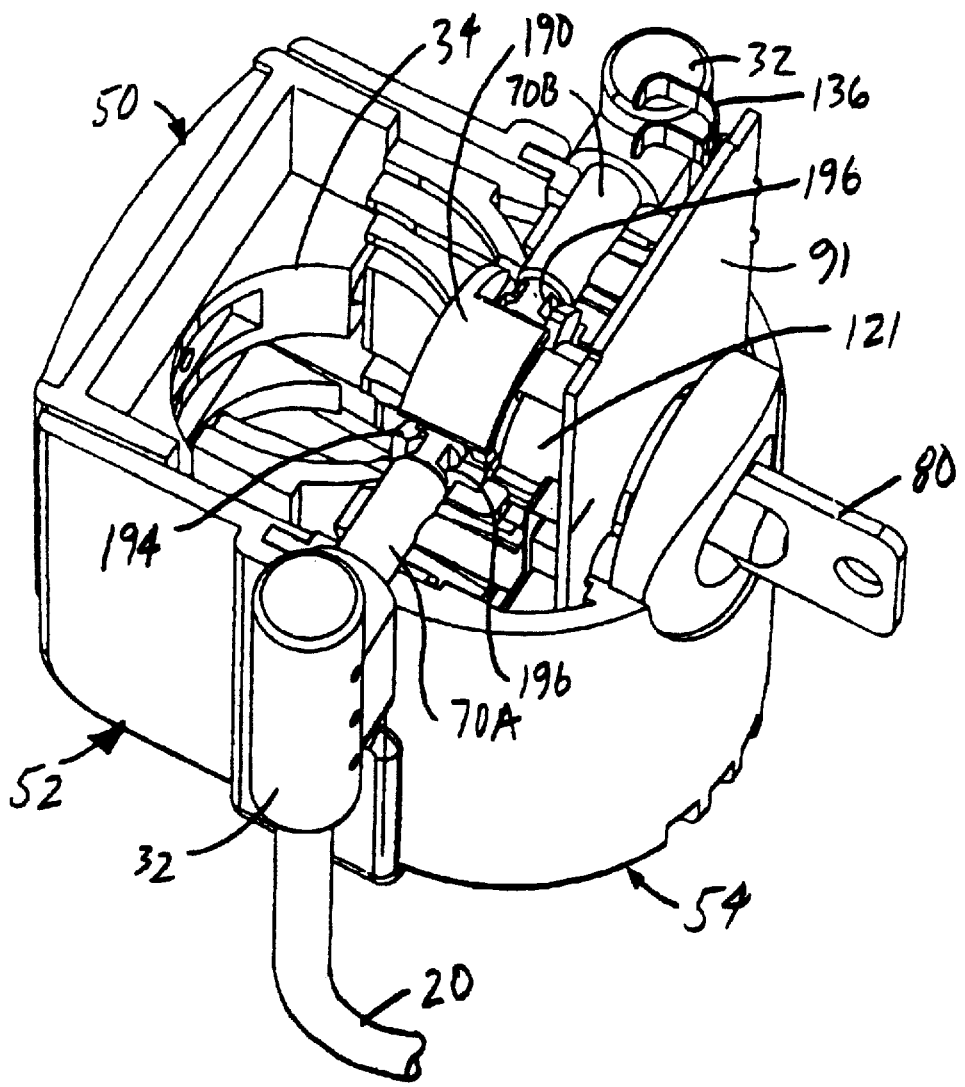
FIG._9A

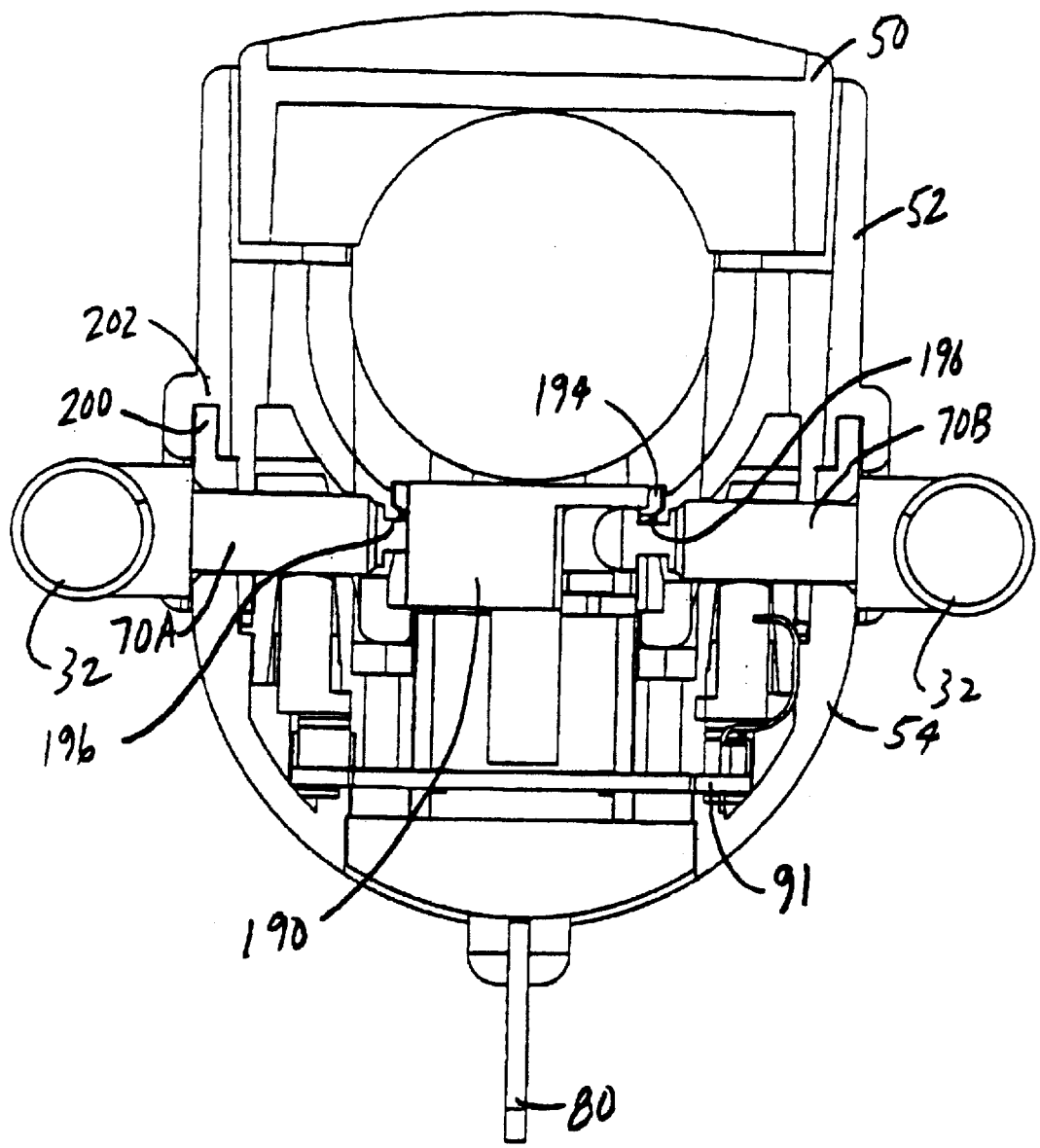
FIG._9B

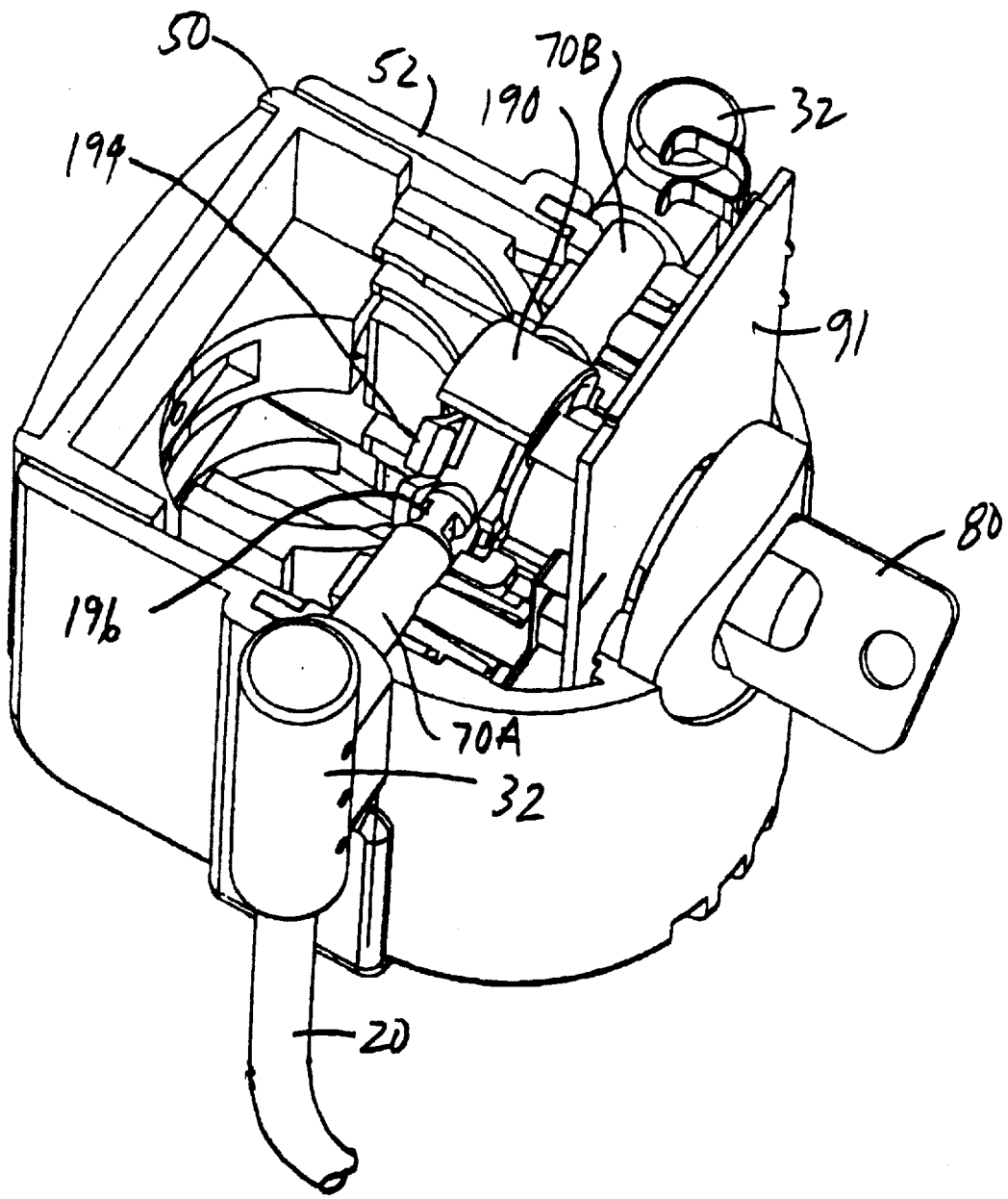
FIG._9C

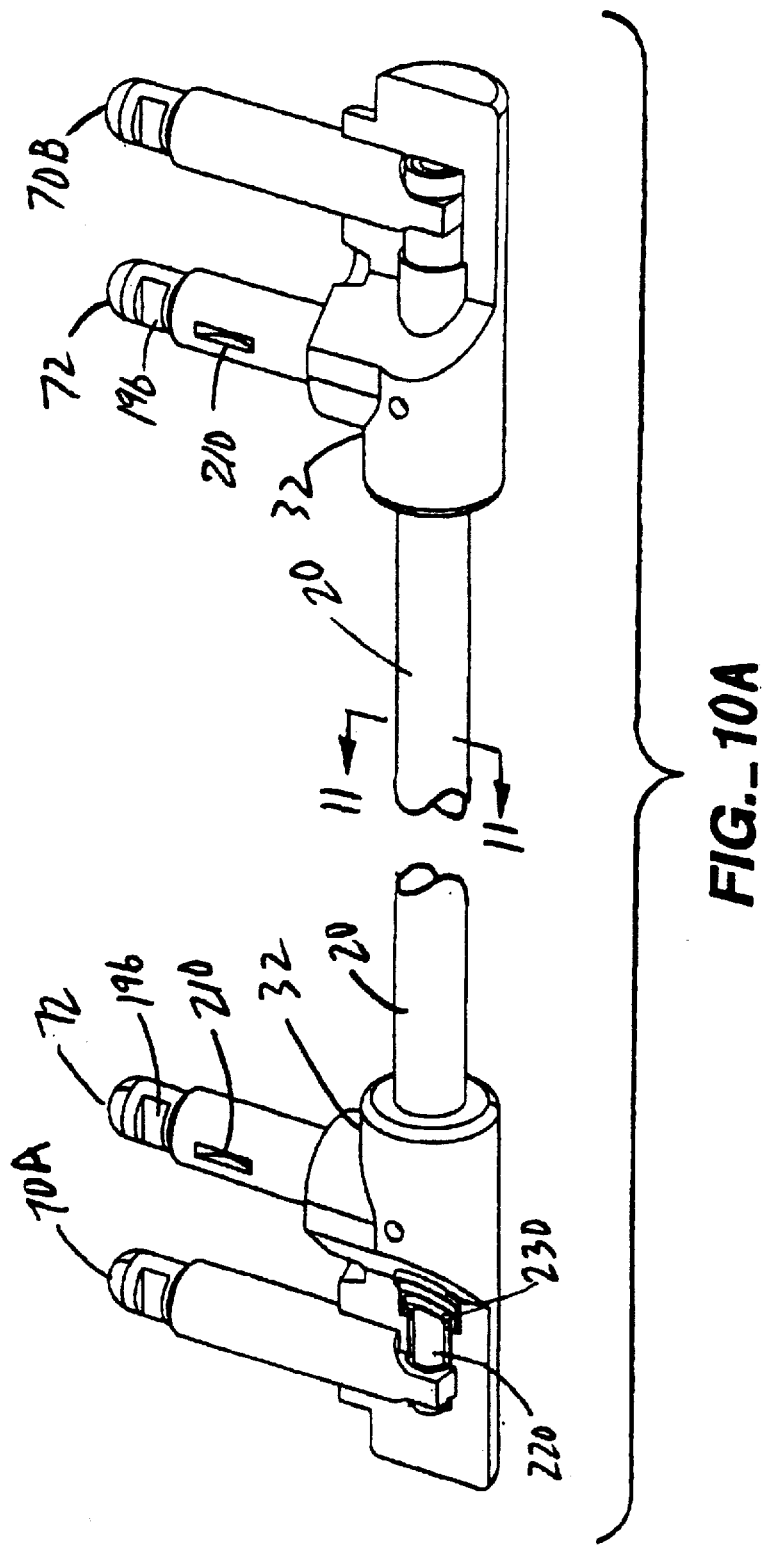
FIG._10A

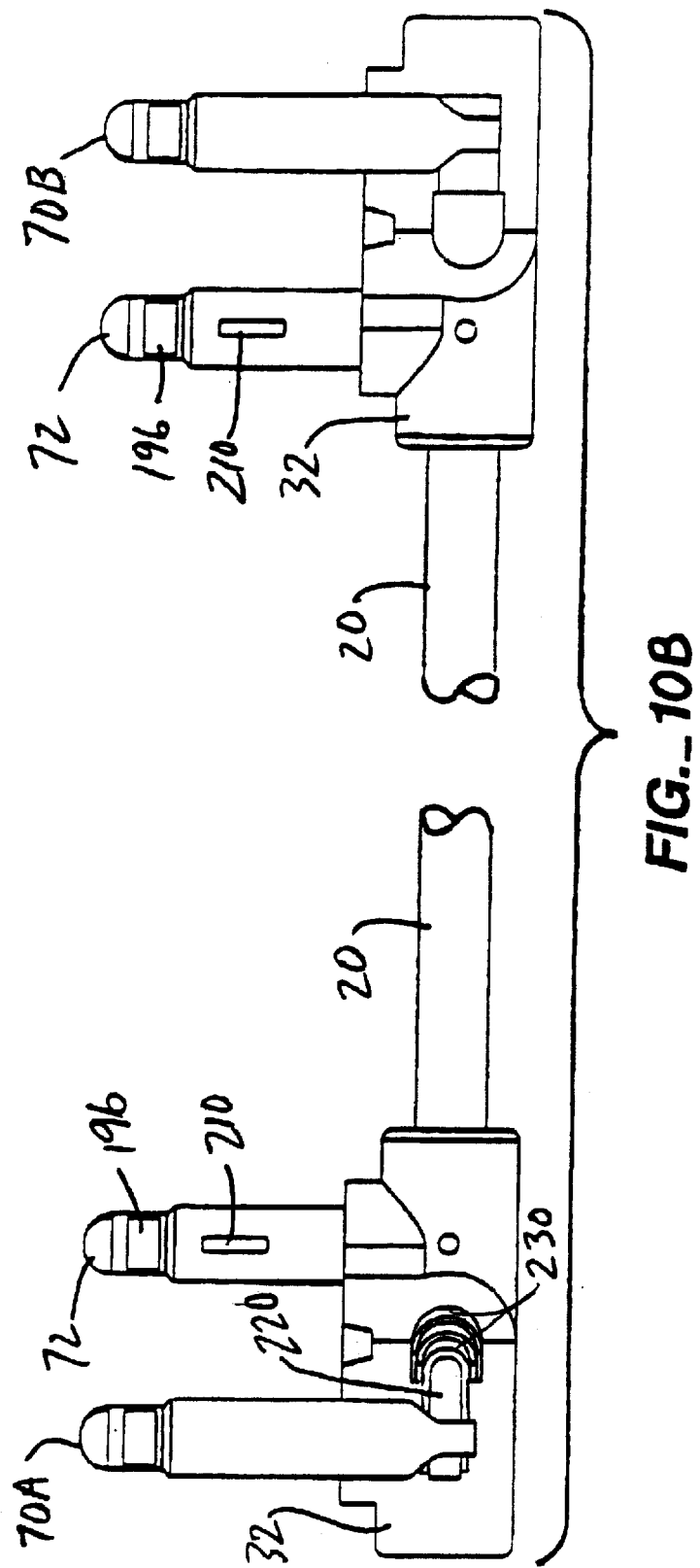

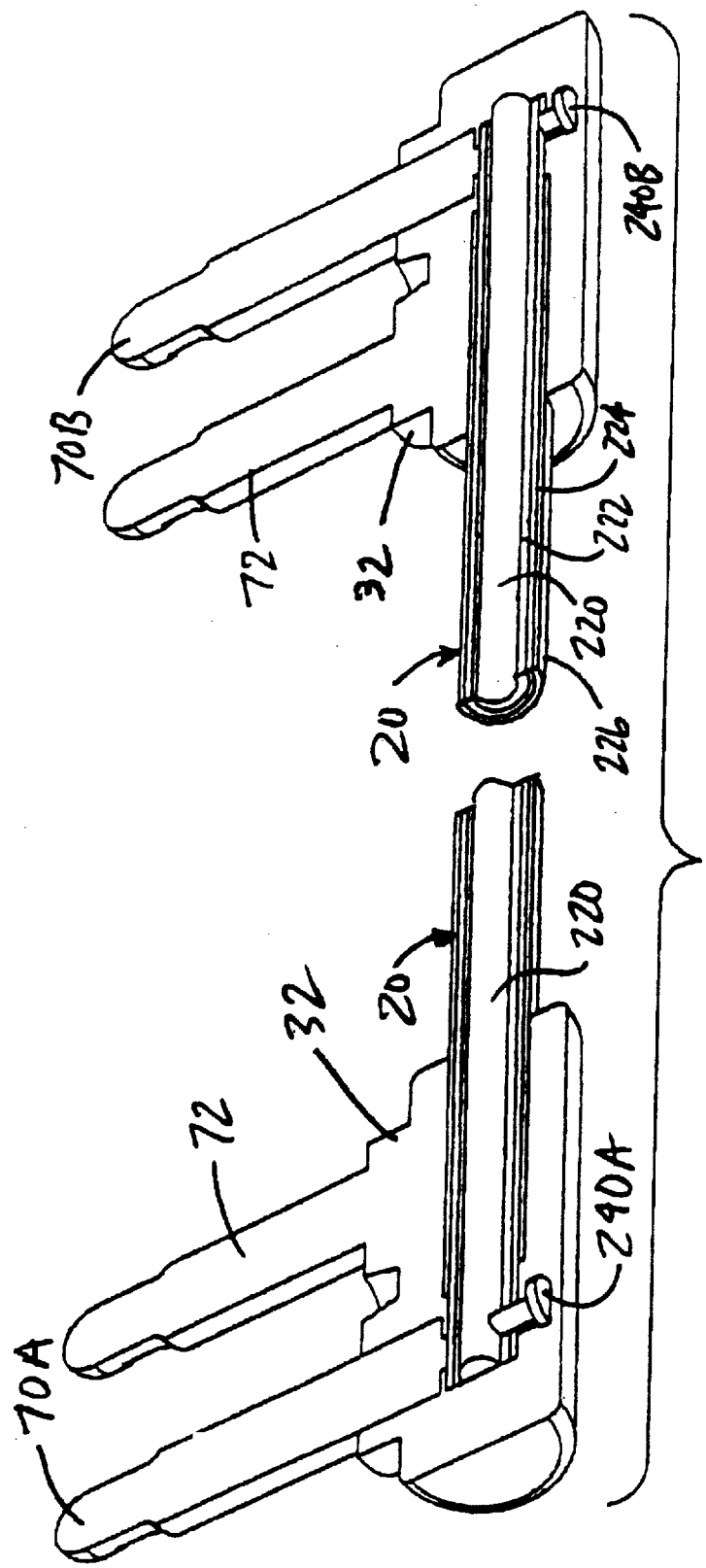
FIG._10C

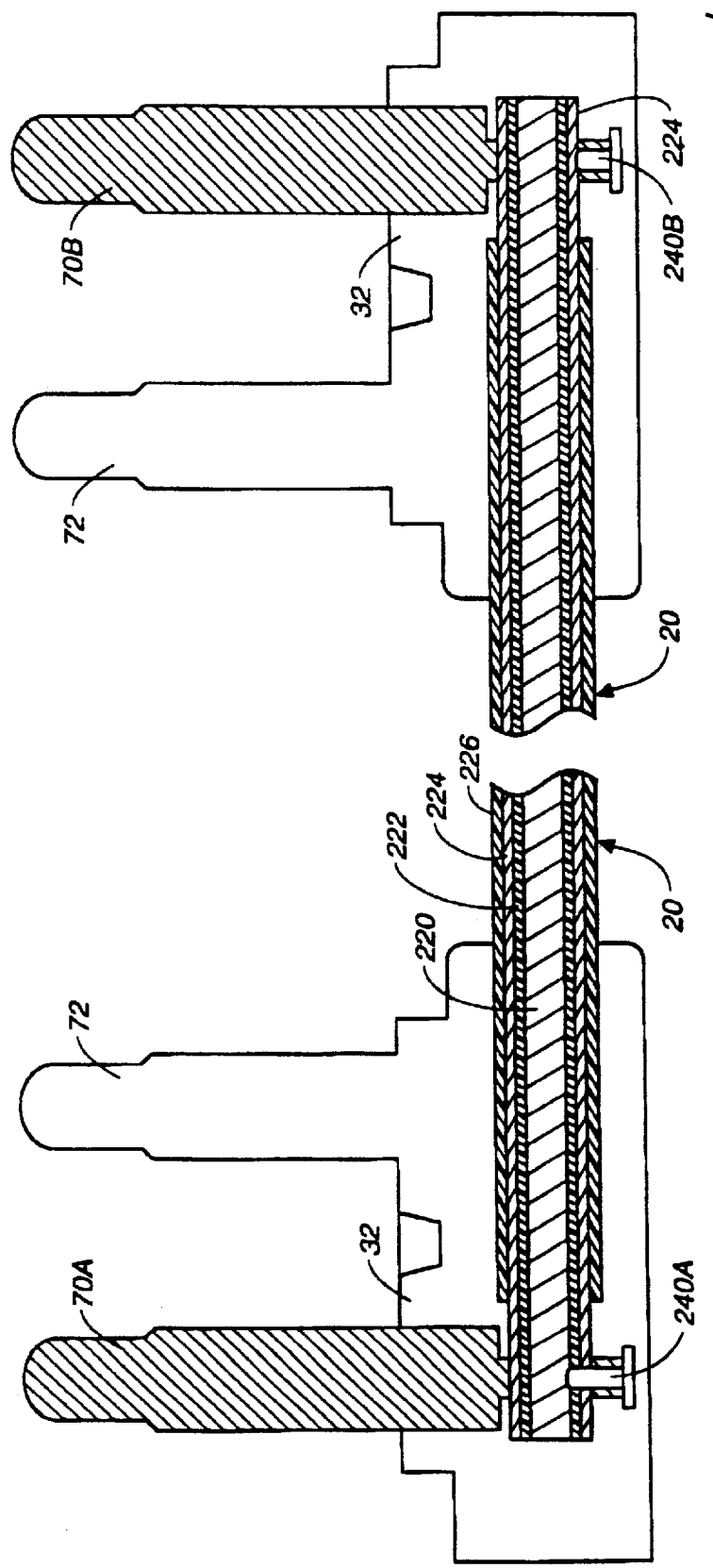
FIG._10D

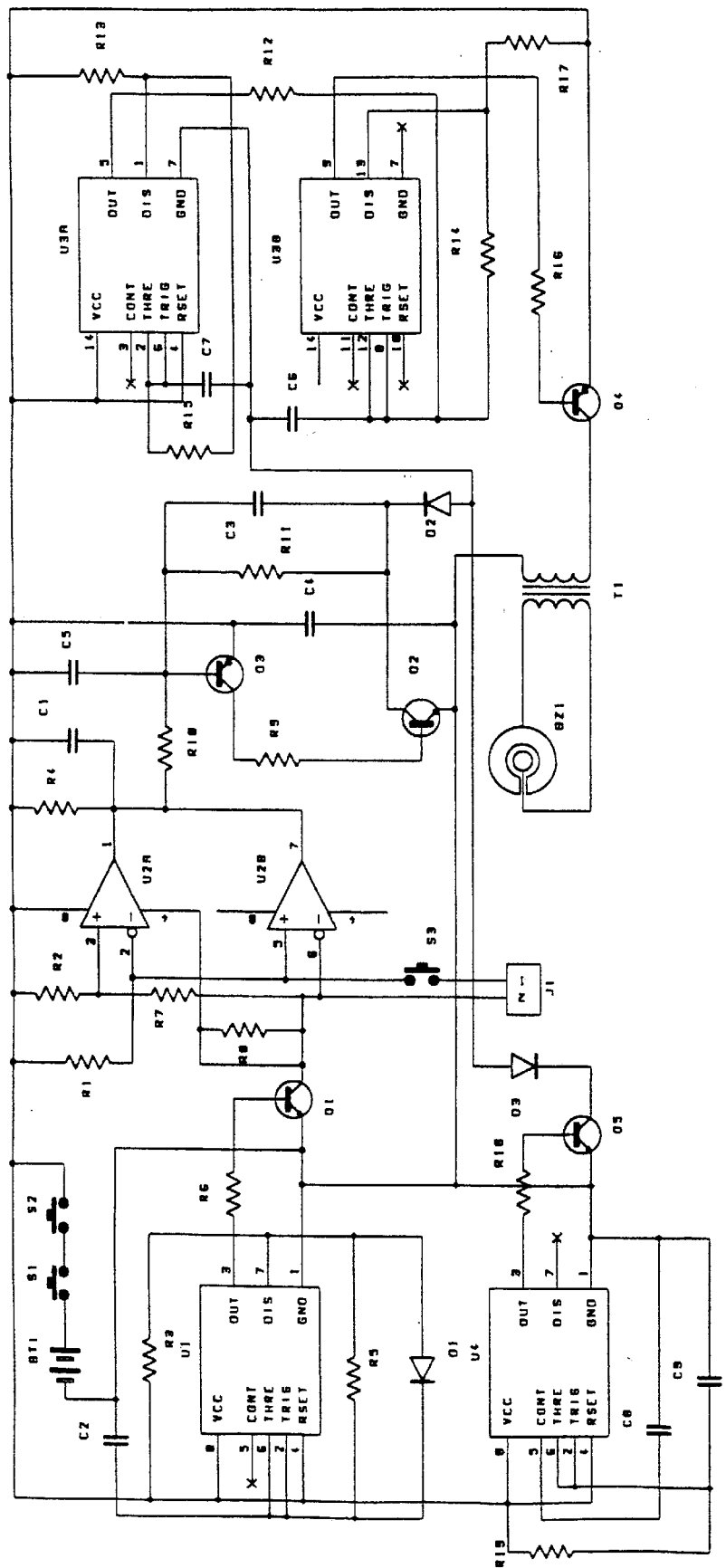
FIG.—12A

| Number | Component | Value | Configuration |
|---|---|---|---|
| U1,U4 | TS555CN CMOS Timer | | Dip-8 |
| U2 | TS3702CN Dual CMOS Comparator | | Dip-8 |
| U3 | NE556 Dual Timer | | Dip-14 |
| Q1,Q2,Q5 | 2N2222 Transistor | | TO-92 |
| Q3,Q4 | 2N3906 Transistor | | TO-92 |
| D1,D2,D3 | 1N914 Diode | | |
| C3 | .001uF Capacitor | 50V 10% | |
| C8 | .01 uF Capacitor | 50V 10% | |
| C1,C2, C4,C5 | .1 uF Capacitor | 50V 10% | Axial Mono |
| C6,C9 | .15 uF Capacitor | 50V 10% | Type ECOAX |
| C7 | .22 uF Capacitor | 50V 10% | |
| R16 | 560 ohm | | |
| R6,R18 | 1K ohm | | |
| R14,R17 | 2.2K ohm | | |
| R4 | 10K ohm | 1/8 Watt Metal Film | |
| R2,R7 R8,R9 | 12K ohm | | |
| R1 | 18K ohm | | |
| R3,R10 R12,R13 | 100K ohm | | |
| R11 | 220K ohm | | |
| R19 | 330K ohm | | |
| R15 | 1M ohm | | |
| R5 | 10M ohm | | |
| S1-S3 | Microminiature Keypad Switch | 24V 50mA | Momentary On |
| T1 | Transformer Miniature | Pri 9V Sec 20V 50mA | |
| BZ1 | Housed Piezo | 115db (or greater @ 20V) | |
| BT1 | 9V Battery | | |
| J1 | Connections to Cable | | |

FIG.-12B

ANTI-THEFT DEVICE

FIELD OF THE INVENTION

The present invention relates to the field of anti-theft devices, which include electronic tamper detection systems and which sound an alarm if theft of a piece of personal property is attempted. Although the present invention is focussed for use on a bicycle, the device can be applied to a variety of types of vehicles and other personal property, by simply adapting the mounting method of the device to the item to be protected.

BACKGROUND OF THE INVENTION

Various methods have been employed for years to secure items of personal property, bicycles, motorcycles and similar vehicles against theft. With the particular current interest in bicycles as well as technological advances in materials and components, bicycles are becoming more sophisticated and more expensive, some costing many hundreds to several thousands of dollars each. The problem of bicycle and motorcycle theft is exacerbated by the light weight and portability of the vehicles. U.S. Pat. No. 5,408,212 issued to Meyers et al. ("the Meyers' patent") combines several recent schemes for preventing bicycle theft. The Meyers' patent also contains a good description of the state-of-the-art of bicycle anti-theft devices, and is incorporated by reference herein.

The "U" lock is widely used as a mechanical deterrent to theft by virtue of its strength. Such locks are used to lock the vehicle frame to a permanent or fixed object. Great force is needed to cut through or break a "U" lock. In the Meyers' patent, a cable with conductive core is utilized as a second means of theft deterrent. When the circuit created by the cable is broken, an alarm sounds either alerting the bicycle owner of an attempted theft, or scaring the thief away by drawing attention to the vehicle.

The Meyers' patent provides yet another mode of protection in that a motion sensor may be set to detect any movement of the bicycle and again, triggers an alarm upon such detection. Such schemes are flawed in that in the case of bicycles, many times while secured in a location with the owner away, the bicycle may be subject to motion by various causes. For example, other riders securing their bicycles may bump the bicycle, or wind may affect the stability of the bicycle. Such influences often trigger the alarm, thereby wasting precious battery power and increasing the possibility that when an actual attempt to take the bicycle is made, no power is left to sound the alarm when really needed.

Other alarms also utilize circuitry which detects discontinuity when the cable of the lock is cut. The drawback to such an alarm is that typically, the alarm does not sound until the cable is cut, and at such a point, the bicycle is already free to be placed in a truck or such vehicle, particularly since a bicycle or motorcycle can be spirited away in less than 1 minute. In many cases, bicycle thieves are petty thieves who cut the cable and ride away on the stolen bicycle. The unwanted attention of an alarm which is activated before the bicycle is set free of its locking cable, particularly when the alarm is securely fixed to the bicycle so that the alarm continues to sound whether the bicycle is ridden away or put into the bed of a pickup truck or other vehicle, constitutes a serious deterrent to theft.

What is needed then, is an anti-theft device with an alarm sensitive cable which is easily replaceable, and which does not have an easily overridden audible alarm. Further, an alarm is needed which detects the initial attempt to cut the cable, sounding the alarm before the bicycle can be spirited away, and moreover, which may reside on the bicycle, keeping the attention of a passersby as the bicycle is moved.

In the prior art, represented by the Meyers' patent, once the locking cable is cut, it is very often not easily replaceable. Also, cables such as those in the Meyers' patent may be defeated by short-circuiting the cable. Such a propensity for getting around the main security means of a locking device renders such a device vulnerable to educated thieves. What is needed then is a circuitry which does not allow subversion by means such as short-circuiting.

The known prior art also involves various schemes to indicate that a system is armed, sometimes without a circuit being armed, but just employing a visual indication of activation to ward off potential thieves. However, professional thieves quickly become acquainted with such products in the market so that fake alarms may be easily recognized, and therefore, ignored. What is needed is both an indication for potential thieves as well as the vehicle owner that a system is real, functioning, and having plenty of power.

The problem with many such indications manifests itself as a constant drain on the power source. A particularly ironic scenario involves an alarm system which is deprived of power by passive systems such that when called upon to sound an alarm, the battery dies during a portion of the alarm duration, or dies altogether, never allowing the alarm to sound at all. What is needed then is a means of conserving power without compromising the detection ability or annunciation intensity of the anti-theft device. Such an anti-theft device can be adapted to a variety of applications, like expensive instruments, costly computers or electronic equipment, and the like.

SUMMARY OF THE INVENTION

Broadly stated, the present invention encompasses an anti-theft device which offers solutions to a variety of shortcomings which are present in the prior art. One advantage of the present invention is to provide a strong and secure lock which remains with the bicycle unless removed by the owner. The device of the present invention utilizes a strong material, typically glass-filled nylon, which is resistant to rain, shattering, ultraviolet light, and temperature, and which is difficult to break or damage. The device provides a means of affixing the lock to the frame which is hidden within the case structure, preventing access to the mounting means.

Summarizing then, the present invention constitutes an improved anti-theft device comprising a multi-part case or case assembly having a hidden interior section for mounting the case to a piece of personal property; a cable of known resistance having at least one cable termination and two conductive components insulated from one another; an alarm circuit having a power source, logic circuitry and a speaker; a mechanical sensor capable of activating the alarm circuit if the device is tampered with; a locking mechanism such that when positioned properly, the cable is electrically connected to the alarm circuit so that if the cable is tampered with, the cable's resistance changes activating the logic circuit to operate the speaker. By the phrase "tampered with", it is meant to include cut, penetrated, separated, severed, or broken into.

Another advantage of the present invention is to provide a means of activating the alarm upon damage to the cable from penetration by a metallic object, or complete separation of the cable. In the present invention, a cable of known resistance is wrapped around a stationary object in the same manner as conventional locking systems. However, in the present invention a multi-layered cabling is used which has two conductors electrically in common with each other such that the resistance of the cable is changed by either penetration of the outer conductor or severing of the cable, thereby activating the alarm. This cable configuration also prevents short-circuiting of the cable. The alarm circuitry employs an integrated circuit with a dual operational amplifier configured as a window comparator. When powered, the circuit "looks for" a particular resistance through the cable. If a resistance lower or higher than the set reference resistance is detected, a series of transistors serves to lock and power the next circuit, activating the alarm speaker.

A further advantage of the present invention is to provide a quick and easy method for the user to arm the anti-theft device. In the present invention, the lock is provided with a locking mechanism which allows the device to be secured to the bicycle when in one position, allows the cables to be inserted in another position thereby enabling arming of the system by simply snapping the cable terminations in the proper orientation, and lastly, in a third position, allowing the cables to be removed, thus silencing the alarm.

In the case of tampering, the circuitry provides that the only way of disabling the speaker is by either disarming the unit by turning the key to the proper orientation and removal of the cables, or by depletion of the power source. Further, sound channels are provided in the front cover to enhance the sound, and at the same time, reduce the ability of an unauthorized person to muffle or mute the speaker. When the lock need not be utilized, the cable can be removed and reinserted in the inverted position allowing the unit to be secured without alarm activation or consumption of power.

Yet another advantage of the invention is to provide a simple way of changing the power source for the alarm. A novel feature of the present invention is the battery compartment, allowing the battery to only be inserted in the correct orientation, directly in electrical contact with the buss terminals of the circuitry and further, pressed into retention by a means which also serves to "eject" or release said battery for rapid change-out.

As previously stated, many anti-theft devices become vulnerable to battery drain, with the potential of having inadequate power available at crucial moments. It is also an advantage of the invention to conserve power, so that the alarm is available as needed, and also to extend the life of the power source. The circuitry of the anti-theft device involves a timer chip generating a 10% duty cycle in order to power the cable loop sensing circuit. The primary function of this circuit is to extend the life of the power source, which is extended up to ten times the normal life of anti-theft devices in the prior art. The battery may last approximately three months if used extensively eight hours per day, five days per week. Some embodiments may be equipped with indicators such as a "chirp"-type annunciator, which announces when the system is energized, or even a low battery warning, comprising a steady "beep".

Another object of the present invention is to sound an alarm of high intensity which is also resistant to muffling. A portion of the alarm circuitry comprises a major component in the form of a dual-timer circuit generating a two-tone frequency and driving a piezo-electric alarm buzzer. The output voltage to the buzzer is stepped up via a small transformer, and channels in the front cover of the case assembly helps direct the sound through several paths making the alarm extremely difficult to silence.

Still another advantage of the present invention is to detect tampering of the anti-theft device housing by mechanically triggering the alarm. When both cable ends are inserted into the case assembly arming the device, an interlock triggers the alarm if the rear section is somehow detached or separated.

It is a further advantage of the present invention to provide an alarm system which is easy to install on a bicycle or other vehicle, mounts securely on any size frame, can be instantly armed, and can only be removed with a key.

BRIEF DESCRIPTION OF THE DRAWINGS

Further features and advantages will become apparent from the following and more particular description of the preferred embodiments of the invention, as illustrated in the accompanying drawings, in which like reference characters generally refer to the same parts or elements throughout the views, and in which:

FIG. 1A is an isometric view of the right side of a bicycle with the anti-theft device of the present invention installed on the vertical frame member and armed with the cable looped in a typical fashion to secure the bicycle.

FIG. 1B is the same view as FIG. 1A, except the device is in the disarmed condition with the cable coiled around the seat post, secured for riding the bicycle.

FIG. 2A is an isometric view of the top, front and right side of the case assembly of the present anti-theft device with the cable terminations in the locked and armed condition.

FIG. 2B is an isometric view of the top, front and right side of the case assembly with the cable terminations in the unlocked and unarmed condition.

FIG. 3 is an exploded isometric view of the top, front and right side of the case assembly shown in FIGS. 2A and 2B showing the rear case section, interior case section and the front cover. Also shown is the primary fastening means to secure the case to the frame of the bicycle and the orientation of the cable terminations on the right and left sides and key in the front of the case assembly.

FIG. 4 is an exploded isometric view of the top, back and right side of the electronics chassis and front cover of the case assembly. The position, location and structure of the elements making up the electronics of the present device are shown within the chassis.

FIG. 5 is an exploded isometric view of the top, back and right side of the interior case section and the front cover.

FIG. 6A is an isometric view of the bottom, back and left side of the electronics chassis including a speaker, a battery in its compartment, and knife edge sensors in ports for the cable terminations which activate the alarm circuitry.

FIG. 6B is an exploded isometric view of the electronics chassis shown in FIG. 6A, including the major parts of the chassis including a battery compartment, a post/reed structure, various switches on the back side of a printed circuit board (PCB) and a speaker. These switches are activated by the closing of the circuitry by knife edge sensors at the end of bus circuitry extending from the PCB and positioned such that when depressed, close against the switches.

FIGS. 6C and 6D are side views showing the configuration of the novel battery compartment.

FIG. 7A is an exploded isometric view of the top, back and right side of the front cover in its orientation with an actuating or locking clip mountable on the locking mechanism on the inside of the front cover and the cable terminations.

FIG. 7B is an exploded isometric view of the moving parts previously shown in FIG. 7A. The lock component is shown in its removal position and the actuating clip which engages the cable terminations is shown with a rectangular slot which accepts the similarly configured lock post seen on the end of the locking mechanism shown in FIG. 7A.

FIG. 7C further shows the relationship of the cable terminations, actuating clip and lock component of FIG. 7B. Further, the aforementioned lock post and rectangular slot are also evident in this view, as are slots in the cable terminations which prevent the depressing of the knife edges of the bus circuitry of FIG. 6B.

FIG. 7D is an isometric view of the top, front and right side of the interior case section and the locking mechanism with the cable terminations in the armed and locked position, but without the front cover and the electronics chassis.

FIG. 7E is another isometric view of the top, front and right side of the internal case section with the cable terminations installed and illustrating that the cable terminations may not be installed in the armed and locked position prior to installing the front cover.

FIGS. 8A, 8B and 8C are front views of differing positions of the locking mechanism, and key, which operates to: lock the front half of the completed device thereby latching the pins of the cable in the full up position (FIG. 8A); unlatch the pins of the cable to allow their removal while the complete case assembly is still locked together (FIG. 8B); and allow removal of the front cover after the pins of the cable have been removed (FIG. 8C).

FIG. 9A is an isometric sectional view of the middle portion of the right side and front of the present device in its locked position. The clip lock, cable terminations, and one of the switches of the chassis comprising the PCB can be seen in this figure, giving a better understanding of how the locking mechanism turns the clip lock to capture or release the cable pins in order to activate or deactivate the alarm circuitry.

FIG. 9B is a top plan view of the sectional shown in FIG. 9A, again showing the position of the clip lock, cable terminations and key in the locked position.

FIG. 9C is an isometric sectional view like that of FIG. 9A except that the key has turned the lock mechanism one eighth of a turn, thereby turning the clip lock, disengaging the ears from the keyways of the cable terminations and allowing them to be removed from the case assembly.

FIG. 10A is an isometric view of the cable and cable terminations, including two partial cutaway views of the molded cable terminations. Also evident by this view is the nature of the layered cable comprising an integral part of the circuitry of the apparatus, as well as the structure of the conducting pins and the keyed slots of the insulating part of the cable terminations.

FIG. 10B is a plan view of FIG. 10A showing the same structural features.

FIG. 10C is an isometric cross-sectional view of the cable and cable terminations shown in FIG. 10A, showing the detail of how the conducting portions of the cable are connected and the relationship of the conducting pins and the non-conducting pins which are integrally molded as part of the cable terminations.

FIG. 10D is a cross-sectional plan view of the cable and cable terminations shown in FIG. 10A, highlighting the electrical relationships of the conducting pins and the cable layers.

FIG. 11 is a cross-sectional view of the cable, showing the various layers of its construction.

FIG. 12A is a schematic diagram of the circuitry of the present device, showing the electrical relationships possible depending on the positioning of the locking mechanism, the limits imposed on the electrical capabilities of the cable, and the energysaving sampling of circuit status.

FIG. 12B is a typical component list of the circuit of FIG. 12A, further disclosing the configuration, operation and electrical limits and features of the circuitry.

DETAILED DESCRIPTION OF THE INVENTION

In the preferred embodiment, anti-theft device 10, is typically armed and secured as shown in FIG. 1A. Device 10 is typically mounted on a vertical frame member 12 of bicycle 14, with electrically activated cable 20 routed through the wheels and most likely also around a fixed object in order to secure the bicycle to a specific location.

FIG. 1B shows anti-theft device 10 in an unarmed, unlocked state. Case assembly 30 of device 10, mounted to vertical frame member 12, is positioned to allow cable 20 to be wrapped around seat post 22 or vertical frame member 12.

FIG. 2A shows additional detail of case assembly 30 in its unarmed and unlocked state. Specifically, cable 20 is installed into case assembly 30 via cable terminations 32. Access 34 for installing case assembly 30 onto vertical frame member 12 of bicycle 14, as shown in FIGS. 1A and 1B is also disclosed in this figure, as is key access 40 and keyway 42. Shims of various thickness (not shown) may be used to size access 34 to accept frames of differing shapes and sizes.

In FIG. 2B, cable 20 is shown in the armed and locked position, extending downward. Also, channels 44 are shown in this figure, which channels serve to amplify the alarm signal of an interior speaker.

FIG. 3 shows the major components of case assembly 30. Rear case section 50 is mated to interior case section 52 by a fastening means, in the preferred embodiment the fastening means comprising a plurality of bolts 62 which extend through coincident bores 66 and 60, to be secured with nuts 64. Also shown are cable terminations 32, with conducting pins 70 and non-conducting pins 72. Pins 70 and 72 engage interior section 52 after first having passed through respective ports 74 and 76 of front cover 54. Key access 40 and key 80 are also shown in FIG. 3, thereby showing the orientation of these parts in the overall layout of case assembly 30.

FIG. 4 shows electronics chassis 90 which contains the electronics of the anti-theft device of this invention. In this perspective, ports 74 and 76 can be seen on either side of front cover 54. Chassis 90 includes the major components of PCB 91, battery 92, which provides power for the circuitry, post 94, reed 96, and a speaker. When case assembly 30 is complete, post 94 which is connected to reed 96, depresses tamper switch 102, which, if released through tampering with the case, opens and activates the circuitry on PCB 91, thereby activating the speaker housed in chassis structure 98. Switch 100, which engages the pins of cable terminations 32 is also seen in this figure.

FIG. 5 shows how front cover 54 is releasably attached to interior section 52. While interior section 52 is secured to the rear section (not shown) by fastening means extending through bores 66, front cover 54 is releasably attached to interior section 52 by ears 120 on locking mechanism 121. Ears 120 may pass through slot 122 in the proper position such that when ears 120 are rotated, the ears are retained by the interior section. Also seen in this figure are ports 74 and 76 of front cover 54, which when the cover is attached to interior section 52, are within the defining surface of slot 110 of interior section 52, thereby allowing the cable terminations (FIG. 3) to pass through the ports and slot. Further, interior section accesses 114 for accepting the vertical frame member 12 (see FIG. 1B) become substantially concentric with front cover accesses 112 as the two parts of case assembly 30 are attached to one another. As with access 34 of FIG. 2A, shims may be used to size the accesses to accept frames of various shapes and sizes.

Integral to the function of the apparatus, is chassis 90, comprised of chassis frame 130 and PCB 91 (previously disclosed in FIG. 4). As seen in FIG. 6A, chassis frame ports 132 on either side of the chassis frame are provided to accept pins 70A and 70B or pin 72 of cable terminations 32 (see FIG. 3). Further, within chassis frame ports 132 are knife edge sensors 134 which are attached to PCB 91 underneath, thereby sensing when conductive pin 70, or non-conducting pin 72 is inserted into chassis frame port 132. Battery 92 is shown installed in its compartment, with busses 136 engaged with the battery's terminals, and retained therein by battery retainer, clip spring 138.

FIG. 6B shows details of chassis 90 including chassis frame 130, PCB 91, and battery 92. Chassis frame 130 contains several structures which serve to operate the circuitry of PCB 91. First, battery 92 may be releasably inserted into a receptacle, housing or compartment comprising spring clip 138, stop 140 and spring 142. Battery 92, a typical 9 volt battery, is provided with large negative terminal 144 and smaller positive terminal 146. Stop 140 is provided with two slots, slot 148 dimensioned to accept terminal 144 and slot 150, dimensioned to accept terminal 146. In this way, the battery terminals are always connected to the electrically corresponding busses 136 of PCB 91. When battery 92 is placed into position against stop 140 and depressed, the battery presses against spring 142 until the battery case passes below shoulder 152 of spring clip 138, unbiasing the spring clip, the shoulder 152 thereby retaining the battery against spring 142. Similarly, to release or remove battery 92, one need only move spring clip 138 such that spring 142 moves battery 92 up and naturally away from busses 136, providing excellent removal from and insertion of battery 92 to chassis frame 130. Chassis frame 130 also comprises slots 160 in ports 132 (see FIG. 6A) for accepting knife edge sensors 134. These knife edge sensors protrude through slots 160 to indicate whether a conductive pin or a non-conductive pin is inserted. When a conductive pin is inserted, the circuitry of PCB 91 is complete, activating switches 100 and 101. Further, post 94 and reed 96 are seen on chassis frame 130 which, when installed in the complete case assembly 30, may depress or open tamper switch 102, shown in phantom behind speaker 170 on PCB 91. PCB 91 is releasably attached to chassis frame 130 by at least one retaining clip 180, which like spring clip 138, is biased to hold PCB 91 proximate to chassis frame 130. Fastening means, in this embodiment comprising hole 182 in PCB 91 and bore 184 in chassis frame 130 serve to fix the chassis frame and the PCB in alignment as established by retaining clips 180.

FIGS. 6C and 6D further show the insertion of battery 92 against stop 140, thereby biasing spring 142, and allowing shoulder 152 of spring clip 138 to retain terminal 144 in electrical contact with buss 136. FIG. 6D shows how biasing spring clip 138 and corresponding shoulder 152 away from the battery, thereby allowing spring 142 to eject the battery as is evident once again by the depiction of FIG. 6C.

FIG. 7A shows clip lock 190, which engages post 192 located on the inside end of lock mechanism 121. Retainers 194 rotate as lock mechanism 121 is rotated, by virtue of the engagement of clip lock 190 with post 192, in order to be placed proximate to and against keyways 196 of pins 70A and 70B or pin 72, depending on whether the apparatus is to be armed or not.

FIG. 7B shows the reverse side of clip lock 190, and further, slot 198 which is dimensioned to engage post 192 (see FIG. 7A) and thereby rotate retainer 194 proximate to and against keyway 196 of posts 70A and 70B or 72. FIG. 7C depicts clip lock 190 engaged with the pins having been rotated into proper position by post 192, engaged in slot 198, rotated by the action of locking mechanism 121, thereby preventing the removal of cable terminations 32 in the completed case assembly 30.

FIG. 7D shows the relationship of the components of FIGS. 7A, 7B, and 7C, with the clip lock installed in internal section 52, and further shows the alignment of post 192 with slot 198, by virtue of the rotation of locking mechanism 121.

FIG. 7E further shows the configuration of internal section 52, and the orientation also of front cover 54. However, as evidenced by this figure, front cover cannot be removed or replaced with cable terminations 32 engaged in internal section 52.

FIGS. 8A, 8B and 8C show the various positions of post 192 on locking mechanism 121. In FIG. 8A, the post is in the locked and alarmed position. In FIG. 8B, post 192 is in the unarmed position when the cable terminations may be removed from case assembly 30, thereby disarming anti-lock device 10. FIG. 8C shows the position of post 192, when the front cover may be removed to change the battery or other reasons, such as maintenance or repair.

FIG. 9A shows the anti-lock device in the armed and locked position, locking mechanism 121 engaged to turn clip lock 190 such that keyways 196 are held by retainers 194, preventing the removal of pins 72 from the front cover 54 assembled to rear internal section 52 and rear section 50. A better view of access 34 of rear section 50 is also seen in this figure.

FIG. 9B shows additional detail of the engagement of keyway 196 with retainers 194 of clip lock 190. Further, the interlocking of male members 200 of front cover 54 to female members 202 of interior section 52 is clearly shown.

FIG. 9C shows key 80 turned such that retainers 194 are disengaged from keyways 196 allowing release of the cable terminations 32 from case assembly 30, thereby disabling the alarm circuitry.

FIGS. 10A–10C and 11 show the construction of cable 20, and its cable terminations 32 which are molded. As can be seen in these figures, conducting pins 70A and 70B are surrounded by molded cable terminations 32. Pin 72 is part of molded termination 32, and is provided with pin slot 210, which avoids depressing knife edge 134 (see FIGS. 6A and 6B) when inserted into case assembly 30. Keyways 196 are also more easily seen in this figure. Conducting pin 70A is electrically connected to conductive tubing 224 and core 220 of cable 20. Conducting pin 70B is electrically connected to conductive tubing 224. Core 220 is protected within cable termination 32 by insulation group 230, defined in more detail below. Briefly, core 220 comprises insulating layer 222 applied to the outside of core 220, conductive tubing 224 covering layer 222 and skin 226 to prevent abrasion of the exterior finish of the cable.

FIGS. 10C and 10D show more clearly the electrical conductive nature and insulative properties of pins 70A and 70B, the molded structure of pin 72 as well as the structure of cable 20. The respective flanged ends 240A and 240B of conductive pins 70A and 70B, and their electrical connection to core 220 and conductive tubing 224 are also depicted in these figures.

FIG. 11 clearly shows the preferred cable of the present invention which is constructed as follows: aircraft cable 220 is coated with vinyl insulating layer 222; the vinyl coated cable is next covered with conductive tubing 224 comprising, for example, 70 sdh silicone, manufactured to provide approximately 4,000 ohms resistance per meter; and lastly having an outer skin of heat-shrink wrapped polyolefin. Conductive tubing 224, in the preferred embodiment is an elastomer and is insulated by insulation group 230 comprising both vinyl covering 222 around aircraft cable 220 and polyolefin outer layer 226. One end of the complete cable is made common to both the aircraft cable and the conductive tubing. A number of equivalent materials may be used as outer insulating layer 226. In the current embodiment, polyolefin with a MIL spec of MIL-1-23053/5 is utilized. Also, polyvinyl chloride would work, e.g., PVC MIL-1-23053/2 heat-shrink is also suitable. Practically speaking, any insulating means that would electrically insulate the conductive elastomer with a dielectric strength of 500 volts which provides protection against elements such as moisture and ultraviolet radiation would suffice.

While the preferred embodiment uses a cable as previously described, other cable configurations may also be used in similar ways. For example, a cable variation utilizing a high resistance core insulated from a low resistance outer layer of armored metal tubing may be employed. In another configuration, a low-resistance core comprising a metal wire surrounded by a layer of a highly tough material such as Kevlar aramid fiber, with a high resistance layer of conductive material and finally a heat-shrink wrapped layer equivalent to that first described above, could also be used. Another embodiment utilizes a hardened inner core such as Kevlar cable or an equivalent material, an insulating layer and a high resistance layer, which while not doubly secure as in the other configurations described, will serve a primary function of setting off the alarm. Of course, variations in the alarm circuitry must be made to accommodate the differing cables. While this last cable configuration uses only a single conductive means, the alarm circuitry would still function. Because the present invention in its preferred embodiment uses a removable cable, various cable designs can be used in a single housing, creating additional embodiments.

FIG. 12A is a schematic representation of the circuitry found on PCB 91. Evident immediately are the roles of switches S1 (100) and S2 (101), which are closed by virtue of the conductive pins 70A and 70B, contacting knife edge sensors 134 (See FIG. 6B). Similarly, switch S3 is normally closed by post 94 and reed 96, will open upon an attempt to pry apart case assembly 30, thereby opening switch S3 and operating speaker 170. Also included in the circuit having switch S3, are cable connections junction J1. If the cable is cut or substantially pierced or otherwise tampered with, the resistance of the cabling changes, causing the dual CMOS comparator to register such a change, again operating the speaker. Also shown is the electrical provision for providing a chirp upon activation of the alarm, and the energy saving means whereby status of the lock is sampled approximately once every one tenth of one second, thereby extending battery life substantially.

FIG. 12B is a listing of electrical components of the circuitry of FIG. 12A.

What is claimed is:

1. An improved anti-theft device comprising:
   a case assembly, said case assembly having a rear section, an interior section and a front cover, said interior section having at least one slot on said interior section's forward-facing edge, said front cover having an outer wall and a bottom wall, said front cover forming at least one port coincident with said interior section's slot when said front cover and said interior section are joined, said front cover forming an aperture on its outer wall and channels along its bottom wall;

mounting means for attaching said interior section to said rear section, securing said property therebetween;

a printed circuit board;

a speaker;

a power source;

a chassis retaining said circuit board and said speaker, said circuit board having alarm circuitry comprising at least one tamper switch to activate said speaker, said chassis forming a compartment for housing said power source, said chassis further comprising access ports positioned to be in substantial alignment with said slot and said front cover's port when said case assembly is complete, said chassis also having a bottom end forming a housing for said speaker, said speaker positioned to direct sound through said channels of said front cover when said case assembly is complete, said chassis further comprising a mechanical tamper detection means, said chassis further comprising a slotted aperture in substantial concentric alignment with said front cover's aperture, said circuit board further comprising cable detecting means, said circuit board also forming a hole in substantial concentric alignment with said slotted aperture;

a keyed lock mechanism having a keyway extending from and along said mechanism's longitudinal axis, and at least one ear at the opposite end of said axis, said opposite end also having a peg, said ear and said peg rotatable by turning a key in said keyway of said lock mechanism, said ear and said peg in fixed position relative to said keyway, said lock mechanism retained in said front cover's aperture;

a clip lock having at least one retaining clip rotatable about its center, said clip lock forming a slot dimensioned to engage said post, said clip lock adapted to be retained by said ear, said clip lock extending into said interior section such that when said key turns said clip lock, said ear engages said slotted aperture retaining said front cover to said interior section and closing said mechanical tamper switch;

a cable of known resistance having at least one termination, said termination releasably insertable through said port and said slot of said interior section, said termination having a keyway engageable with said retaining clip, said termination when so engaged also completing said alarm circuit of said circuit board such that when said alarm is energized, removal of said termination activates said tamper switch thereby activating said alarm, said energized circuit broken by the opening of said mechanical tamper switch when said case assembly is tampered with, thereby activating said alarm circuitry and operating said speaker.

2. The anti-theft device of claim 1 wherein said housing for said power source comprising a bottom surface having a spring biased upward, positive and negative busses from an associated circuit, said busses extending to one end of said housing;
   a stop at one end of said housing forming slots dimensioned to accept the terminals of a battery in contact with said busses;

a spring clip having a shoulder, said spring clip acting to position said shoulder to retain said battery against said spring, said spring clip also acting to remove said shoulder from said battery allowing said battery to be ejected from said housing by said spring.

3. The anti-theft device of claim 1 wherein said cable comprises a hardened metal core surrounded by a first layer of vinyl insulation, a second layer of conductive elastomer of known resistance value and a third layer of outer insulating material, said metal core electrically connected to said second layer at said cable termination such that a cutting device contacting said conductive layer and said core changes the resistance of said circuit thereby activating said speaker.

4. The anti-theft device of claim 3 wherein said outer insulating material comprises heat-shrink wrapped polyolefin.

5. An improved anti-theft device for personal property comprising:

a case assembly, said case assembly having a rear section, an interior section having at least one slot on said interior section's forward-facing edge, and a front cover having an outer wall and a bottom wall, said front cover forming at least one port coincident with said interior section's slot when said front cover and said interior section are joined, said front cover forming an aperture on its outer wall and channels along its bottom wall;

mounting means for attaching said interior section to said rear section, securing said property therebetween;

a printed circuit board;

a speaker;

a power source;

a chassis retaining said circuit board and said speaker thereon, said circuit board having alarm circuitry comprising at least one tamper switch to activate said speaker, said chassis forming a compartment for housing said power source, said chassis further comprising access ports positioned to be in substantial alignment with said slot and said front cover's port when said case assembly is complete, said chassis also having a bottom end forming a housing for said speaker, said speaker positioned to direct sound through said channels of said front cover when said case assembly is complete, said chassis further comprising a mechanical tamper detection means, said chassis further comprising a slotted aperture in substantial concentric alignment with said front cover's aperture, said circuit board further comprising cable detecting means, said circuit board also forming a hole in substantial concentric alignment with said slotted aperture;

a keyed lock mechanism having a keyway extending from and along said mechanism's longitudinal axis and at least one ear at the opposite end of said axis, said opposite end also having a peg, said ear and said peg rotatable by turning a key in said keyway of said lock mechanism, said ear and said peg in fixed position relative to said keyway, said lock mechanism retained in said front cover's aperture;

a clip lock having at least one retaining clip rotatable about its center, said clip lock forming a slot dimensioned to engage said post, said clip lock adapted to be retained by said ear, said clip lock extending into said interior section such that when said key turns said clip lock, said ear engages said slotted aperture retaining said front cover to said interior section and closing said mechanical tamper switch;

a cable of known resistance having at least one termination, said termination releasably insertable through said port and said slot of said interior section, said termination having a keyway engageable with said retaining clip when said key is rotated to a proper position, said termination when so engaged also completing said alarm circuit of said circuit board such that when said alarm is energized, removal of said termination activates said tamper switch thereby activating said alarm, said energized circuit broken by the opening of said mechanical tamper switch when said case assembly is tampered with, thereby activating said alarm circuitry and operating said speaker;

said housing for said power source comprising a bottom surface having a spring biased upward, positive and negative busses from an associated circuit, said busses extending to one end of said housing;

a stop at one end of said housing forming slots dimensioned to accept the terminals of a battery in contact with said busses;

a spring clip having a shoulder, said spring clip acting to position said shoulder to retain said battery against said spring, said spring clip also acting to remove said shoulder from said battery allowing said battery to be ejected from said housing by said spring; and said cable comprising a hardened metal core surrounded by a first layer of vinyl insulation, a second layer of conductive elastomer of known resistance value, and a third layer of polyolefin, said metal core electrically connected to said second layer at said cable termination such that any cutting device contacting said conductive layer said core changes the resistance of said cable, said change in said resistance sensed by said logic circuit thereby activating said speaker.

* * * * *